United States Patent
Omoto et al.

(10) Patent No.: US 9,810,263 B2
(45) Date of Patent: *Nov. 7, 2017

(54) RETAINER SEGMENT FOR A ROLLER BEARING FOR SUPPORTING A MAIN SHAFT OF A WIND-POWER GENERATOR

(71) Applicant: NTN CORPORATION, Osaka (JP)

(72) Inventors: Tatsuya Omoto, Suzuka (JP); Eiichi Nakamizo, Kunitachi (JP); Tomoya Sakaguchi, Kuwana (JP)

(73) Assignee: NTN CORPORATION, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/279,539

(22) Filed: May 16, 2014

(65) Prior Publication Data

US 2014/0248018 A1    Sep. 4, 2014

Related U.S. Application Data

(63) Continuation of application No. 12/310,798, filed on Mar. 6, 2009, now Pat. No. 8,764,304.

(30) Foreign Application Priority Data

Sep. 8, 2006   (JP) .................................. 2006-244396
Sep. 8, 2006   (JP) .................................. 2006-244397

(Continued)

(51) Int. Cl.
    *F16C 33/56*   (2006.01)
    *F16C 33/46*   (2006.01)
    (Continued)

(52) U.S. Cl.
    CPC .............. *F16C 33/513* (2013.01); *F03D 9/25* (2016.05); *F03D 80/70* (2016.05); *F16C 19/364* (2013.01);
    (Continued)

(58) Field of Classification Search
    CPC ...... F16C 33/30; F16C 11/0666; F16C 19/00; F16C 19/381; F16C 2300/14;
    (Continued)

(56) References Cited

U.S. PATENT DOCUMENTS 5,015,105 A * 5/1991 Ueno ..................... F16C 33/416
                                                         384/526
5,184,899 A * 2/1993 Harimoto .............. F16C 33/516
                                                         384/448

(Continued)

FOREIGN PATENT DOCUMENTS

CN        1824962           8/2006
EP        0492660 A1 *      7/1992   .............. F16C 10/20
(Continued)

OTHER PUBLICATIONS

J.T. Mottram et al., "Thermal expansion . . . phenolic-fibre composites", Journal of Materials Science, vol. 27, No. 18, Jan. 1, 1992, pp. 5015-5026.

(Continued)

*Primary Examiner* — Caridad Everhart
(74) *Attorney, Agent, or Firm* — Clark & Brody

(57) ABSTRACT

A tapered roller bearing (31a) has a plurality of retainer segments (11a, 11d) each having a pocket to house a tapered roller (34a), and arranged so as to be continuously lined with each other in a circumferential direction between an outer ring (32a) and an inner ring (33a). The retainer segment (11a, 11d) is formed of a resin containing a filler material to lower a thermal linear expansion coefficient. In addition, a clearance (39a) is provided between the first retainer segment (11a) and the last retainer segment (11d) after the plurality of retainer segments (11a, 11d) have been arranged in the circumferential direction without providing any clearance. Here a circumferential range (R) of the clearance (39a) is larger than 0.075% of a circumference of a circle passing (Continued)

through a center of the retainer segment (11a, 11d) and smaller than 0.12% thereof at room temperature.

7 Claims, 27 Drawing Sheets

(30) Foreign Application Priority Data

| | | |
|---|---|---|
| Dec. 27, 2006 | (JP) | 2006-352462 |
| Jun. 4, 2007 | (JP) | 2007-148352 |
| Jun. 4, 2007 | (JP) | 2007-148353 |

(51) Int. Cl.

| | |
|---|---|
| *F16C 33/51* | (2006.01) |
| *F16C 19/36* | (2006.01) |
| *F03D 80/70* | (2016.01) |
| *F03D 9/25* | (2016.01) |
| *F16C 41/04* | (2006.01) |
| *F16C 43/04* | (2006.01) |
| *F16C 19/38* | (2006.01) |

(52) U.S. Cl.
CPC ........ *F16C 33/467* (2013.01); *F16C 33/4635* (2013.01); *F16C 33/56* (2013.01); *F16C 41/04* (2013.01); *F16C 19/386* (2013.01); *F16C 33/4676* (2013.01); *F16C 43/04* (2013.01); *F16C 2208/36* (2013.01); *F16C 2240/46* (2013.01); *F16C 2300/14* (2013.01); *F16C 2360/31* (2013.01)

(58) Field of Classification Search
CPC ...... F16C 2360/31; F16C 25/08; F16C 43/04; F16C 33/56; F16C 33/4635; F16C 33/513; F16C 33/467; F16C 33/4676; F16C 2240/46; F16C 19/364; F16C 19/386; F16C 2208/36; H01L 22/26; H01L 22/12; H01L 31/1804; H01L 31/1864; F03D 9/25
USPC .................................. 384/548, 572
See application file for complete search history.

(56) References Cited

U.S. PATENT DOCUMENTS

| | | | |
|---|---|---|---|
| 6,113,274 A | | 9/2000 | Horimoto |
| 6,302,405 B1 * | | 10/2001 | Edwards ............... E21B 33/10 277/336 |
| 8,764,304 B2 | | 7/2014 | Omoto et al. |
| 2002/0097939 A1 * | | 7/2002 | Matsuyama ........ F16C 33/3856 384/572 |
| 2003/0099416 A1 | | 5/2003 | Kinno et al. |
| 2004/0252924 A1 | | 12/2004 | Kiuchi et al. |
| 2005/0109666 A1 | | 5/2005 | Eggum |
| 2006/0068184 A1 * | | 3/2006 | Hamada et al. ............ 428/220 |
| 2008/0097026 A1 | | 4/2008 | Nagai et al. |
| 2008/0277937 A1 | | 11/2008 | Chuo |
| 2011/0103730 A1 * | | 5/2011 | Oya ................... F16C 33/3812 384/548 |

FOREIGN PATENT DOCUMENTS

| | | |
|---|---|---|
| EP | 1 408 248 | 4/2006 |
| GB | 2 361 965 | 11/2001 |
| JP | 54-151752 | 11/1979 |
| JP | 57-144621 U | 9/1982 |
| JP | 1-242662 | 9/1989 |
| JP | 6-58334 | 3/1994 |
| JP | 7-127645 | 5/1995 |
| JP | 8-219149 | 8/1996 |
| JP | 09-144761 | 6/1997 |
| JP | 9-506154 | 6/1997 |
| JP | 09-177770 | 7/1997 |
| JP | 2000-145790 | 5/2000 |
| JP | 2001-122148 | 5/2001 |
| JP | 2001-200854 | 7/2001 |
| JP | 2002-122148 | 4/2002 |
| JP | 2002-357224 | 12/2002 |
| JP | 2003-13967 | 1/2003 |
| JP | 2003-042148 | 2/2003 |
| JP | 2003-074677 | 3/2003 |
| JP | 2003-278746 | 10/2003 |
| JP | 2003-336642 | 11/2003 |
| JP | 2004-019921 | 1/2004 |
| JP | 2004-338584 | 12/2004 |
| JP | 2005-061434 | 3/2005 |
| JP | 2005-098418 | 4/2005 |
| JP | 2005-105917 | 4/2005 |
| JP | 2005-147331 | 6/2005 |
| JP | 2005-207517 | 8/2005 |
| JP | 2005-221001 | 8/2005 |
| JP | 2005-231428 | 9/2005 |
| JP | 2005-265126 | 9/2005 |
| JP | 2006-125486 | 5/2006 |
| JP | 2006-177446 | 7/2006 |
| JP | 2006-177447 | 7/2006 |
| JP | 2006-177559 | 7/2006 |
| JP | 2006-214545 | 8/2006 |
| JP | 2006-226496 | 8/2006 |
| JP | 2006-308080 | 11/2006 |
| JP | 2007-010026 | 1/2007 |
| JP | 2007-024294 | 2/2007 |
| WO | WO2006087861 * | 8/2006 ............ F16C 19/24 |

OTHER PUBLICATIONS

J.A. Barnes et al., "Thermal expansion . . . PEEK composites" Journal of Materials Science, vol. 26, No. 8, Jan. 1, 1991, pp. 2259-2271.

J.A. Barnes, "Thermal expansion . . . thermoplastic composites", Journal of Materials Science, vol. 28, No. 18, Jan. 1, 1993, pp. 4974-4982.

* cited by examiner

RETAINER SEGMENT FOR A ROLLER BEARING FOR SUPPORTING A MAIN SHAFT OF A WIND-POWER GENERATOR

This application is a Divisional of U.S. Ser. No. 12/310,798 filed on Mar. 6, 2009, which is a national phase of PCT/JP2007/067199 filed on Sep. 4, 2007.

TECHNICAL FIELD

The present invention relates to a roller bearing, a retainer segment of a roller bearing for supporting a main shaft of a wind-power generator, and a main shaft support structure of the wind-power generator and more particularly, to a retainer segment arranged in a circumferential direction to form one retainer of a roller bearing for supporting a main shaft of a wind-power generator, and a roller bearing and a main shaft support structure containing the retainer segment of the roller bearing for supporting the main shaft of the wind-power generator.

BACKGROUND ART

A roller bearing is composed of an outer ring, an inner ring, a plurality of rollers arranged between the outer ring and the inner ring, and a retainer retaining the plurality of rollers in general. The retainer is composed of one integrated, that is, annular component in general.

Since a roller bearing to support a main shaft of a wind-power generator provided with a blade for receiving wind has to receive a high load, the roller bearing itself is large in size. Thus, since the components such as a roller and a retainer that compose the roller bearing are large in size also, it is difficult to produce and assemble the components. In this case, when each component can be split, the production and assembling become easy.

Here, a technique concerned with a split type retainer split by a split line extending along a rotation axis of a bearing, in a roller bearing is disclosed in European Patent Publication No. 1408248A2. FIG. 39 is a perspective view showing a retainer segment of the split type retainer disclosed in the European Patent Publication No. 1408248A2. Referring to FIG. 39, a retainer segment 101a includes a plurality of column parts 103a, 103b, 103c, 103d, and 103e extending along a rotation axis of a bearing so as to form a plurality pockets 104 to house rollers, and connection parts 102a and 102b extending in a circumferential direction so as to connect the plurality of column parts 103a to 103e.

FIG. 40 is a sectional view showing a part of a tapered roller bearing containing the retainer segment 101a shown in FIG. 39. Referring to FIGS. 39 and 40, a constitution of a tapered roller bearing 111 containing the retainer segment 101a will be described. The tapered roller bearing 111 includes an outer ring 112, an inner ring 113, a plurality of tapered rollers 114, and a plurality of retainer segments 101a, 101b, and 101c retaining the plurality of tapered rollers 114. The plurality of tapered rollers 114 are retained by the plurality of retainer segments 101a and the like in the vicinity of a PCD (Pitch Circle Diameter) 105 in which the behavior of the roller is most stable. The retainer segment 101a retaining the plurality of tapered rollers 114 is connected such that the column parts 103a and 103e positioned outermost in the circumferential direction abut on the circumferentially adjacent retainer segments 101b and 101c having the same configuration. The plurality of retainer segments 101a, 101b, and 101c are continuously lined with each other and assembled in the tapered roller bearing 111, whereby one annular retainer is formed in the tapered roller bearing 111.

According to the European Patent Publication No. 1408248A2, after the retainer segments formed of a resin have been arranged so as to be continuously lined with each other, a circumferential range of a last clearance generated between the first retainer segment and the last retainer segment is to be not less than 0.15% of a circumference of a circle passing through the center of the retainer segment but less than 1% thereof. In this constitution, a collision noise due to collision of the retainer segments is prevented, and the retainer segments are prevented from being stuck due to thermal expansion. In addition, according to the European Patent Publication No. 1408248A2, the retainer segment is formed of polyphenyl sulfide (referred to as "PPS" hereinafter), or polyether ether ketone (referred to as "PEEK" hereinafter).

Here, even when the circumferential range of the clearance is set within the above range, the following problem on which the inventor focused is not solved. FIG. 41 is a schematic sectional view showing a part of the tapered roller bearing 111 when the tapered roller bearing 111 is used as the bearing to support the main shaft of the wind-power generator. In addition, a clearance 115 generated between the retainer segments 101a and 101c is shown with exaggeration in order to be easily understood.

Referring to FIG. 41, a main shaft 110 of the wind-power generator supported by the tapered roller bearing 111 is used as a horizontal shaft. When the tapered roller bearing 111 is used, the retainer segments 101a to 101c revolve in a direction shown by arrows in FIG. 41. The retainer segments 101a to 101c revolve such that the retainer segments 101a to 101c push the adjacent retainer segments 101a to 101c continuously in the direction of the arrows. In this case, the tapered roller and the retainer segment 101a free-fall at a position shown by XXXXI in FIG. 41. In this case, since the retainer segments 101a and 101c collide with each other, the retainer segments 101a and 101c are deformed, and end faces thereof abrade away, and a collision noise is generated, which could considerably lower the function of the tapered roller bearing 111.

When the tapered roller bearing 111 is used as the bearing to support the main shaft 110 of the wind-power generator, since the retainer segments 101a to 101c are large in size, the problem due to the collision at the time of free-falling is serious. Therefore, the above-described range of the clearance is not preferable and the circumferential clearance needs to be smaller. However, there is a limit of reducing the circumferential range of the clearance in the case of the retainer segment formed of the resin due to thermal expansion.

DISCLOSURE OF THE INVENTION

It is an object of the present invention to provide a roller bearing capable of preventing its function from being lowered.

It is another object of the present invention to provide a roller bearing capable of preventing a retainer segment from being damaged and enabling a roller to roll smoothly.

It is still another object of the present invention to provide a retainer segment of a roller bearing for supporting a main shaft of a wind-power generator capable of preventing a function of the bearing from being lowered.

It is still another object of the present invention to provide a retainer segment of a roller bearing for supporting a main shaft of a wind-power generator capable of preventing the retainer segment from being damaged and enabling a roller to roll smoothly.

It is still another object of the present invention to provide a main shaft support structure of a wind-power generator capable of preventing its function from being lowered.

It is still another object of the present invention to provide a long-lived main shaft support structure of a wind-power generator.

A roller bearing according to the present invention includes an outer ring, an inner ring, a plurality of rollers arranged between the outer ring and the inner ring, and a plurality of retainer segments each having a pocket to house the roller, and arranged to be continuously lined with each other in a circumferential direction between the outer ring and the inner ring. The retainer segment is formed of a resin containing a filler material to lower a thermal linear expansion coefficient. In addition, a clearance is provided between the first retainer segment and the last retainer segment after the plurality of retainer segments have been arranged in the circumferential direction without providing any clearance. Here, a circumferential range of the clearance is larger than 0.075% of a circumference of a circle passing through a center of the retainer segment and smaller than 0.12% thereof, at room temperature.

Thus, since the retainer segment is formed of the resin containing the filler material to lower the thermal linear expansion coefficient, the dimensional change of the retainer segment due to the thermal expansion can be reduced. Thus, the circumferential clearance generated between the retainer segments can be smaller than the range disclosed in the European Patent Publication No. 1408248A2.

Here, the bearing components such as the outer ring, the inner ring, and the tapered roller in the tapered roller bearing are made of steel such as case-hardening steel in general. Thus, the bearing component such as the outer ring also thermally expands due to a temperature change. Here, when the thermal linear expansion coefficient of the retainer segment and the thermal linear expansion coefficient of the bearing component are taken into account, the circumferential range of the clearance at room temperature can be reduced to 0.075% of the circumference of the circle passing through the center of the retainer segment in practical usage. Consequently, since the circumferential clearance is larger than 0.075% of the circumference, the circumferential range of the clearance is prevented from becoming negative and the retainer segments are prevented from being pressed and stuck.

In addition, it is preferable that a safe ratio of the retainer composed of the plurality of retainer segments is high in the tapered roller bearing used in the above usage in view of durability and reliability improvement. The safe ratio of the retainer becomes high as the circumferential range of the clearance is decreased. The safe ratio of the retainer is required to be 4.0 or more in view of fatigue strength of the material of the retainer segment and a stress generated in the retainer segment. Here, when the circumferential range of the clearance at room temperature is smaller than 0.12% of the circumference of the circle passing through the center of the retainer segment, the safe ratio can be surely 4.0 or more. Thus, the defect in strength due to the collision between the retainer segments, including the above problem, can be prevented.

When the retainer segment is formed of the resin containing the filler material to lower the thermal linear expansion coefficient, and the circumferential clearance between the retainer segments is within the above range, the defect in strength due to the collision between the retainer segments and the deformation due to circumferential pressing between the retainer segments can be prevented. Therefore, the function of the bearing having the above retainer segment can be prevented from being lowered.

Here, the retainer segment is a unit body split by the split line extending along the rotation axis of the bearing so as to have at least one pocket to house the roller in one annular retainer. In addition, the first retainer segment designates the retainer segment arranged first when the retainer segments are arranged so as to be continuously lined with each other in the circumferential direction, and the last retainer segment designates the retainer segment arranged last when the retainer segments are arranged so as to be continuously lined with each other in the circumferential direction such that the adjacent retainer segments abut on each other. The plurality of retainer segments are arranged so as to be continuously lined with each other in the circumferential direction and assembled in the roller bearing, whereby the one annular retainer is constituted.

Preferably, the filler material contains carbon fiber and/or glass fiber. Since the filler material is in the form of fiber, the thermal linear expansion coefficient, that is, thermal expansion coefficient can be effectively lowered.

Further preferably, the resin is PEEK. According to PEEK, its thermal expansion coefficient is lower than other resins and the filler material can be easily contained to lower the thermal expansion coefficient.

Further preferably, the thermal linear expansion coefficient of the resin is $1.3 \times 10^{-5}/C.°$ to $1.7 \times 10^{-5}/C.°$. The member such as the outer ring that composes the bearing is formed of steel such as case-hardening steel in general. The thermal linear expansion coefficient of such steel is about $1.12 \times 10^{-5}/C.°$. Therefore, when the thermal linear expansion coefficient of the resin is within the above range, the difference in thermal linear expansion coefficient from the bearing component such as the outer ring is allowable in the practical usage. In addition, the thermal linear expansion coefficient of PEEK is about $4.7 \times 10^{-5}/C.°$, and the thermal linear expansion coefficient of PPS is about $5.0 \times 10^{-5}/C.°$.

Further preferably, a filling rate of the filler material in the resin is 20% by weight to 40% by weight. When the filling rate of the filler material in the resin is within the above range, the thermal expansion coefficient of the resin can be greatly reduced without generating other defects due to the filler material.

Further preferably, the roller is a tapered roller. The roller bearing used in the main shaft of the wind-power generator has to receive high moment load, thrust load, and radial load. Here, since the roller is the tapered roller, high moment load and the like can be received.

Further preferably, the retainer segment has a plurality of column parts extending along a rotation axis of the bearing so as to form pockets to house the rollers, and a connection part extending in the circumferential direction so as to connect the plurality of column parts. The retainer segment guides the rollers. One guide click having a contact part with the roller and a recess part formed on the circumferential inner side of the contact part are provided at a side wall surface of the column part.

The retainer segment disclosed in the European Patent Publication No. 1408248A2 guides the track ring. Meanwhile, when the split type retainer segment guides the rollers, damage and collision noise can be reduced at the time of contact with the track ring.

Here, the guide click that is in contact with the roller is provided at the side wall surface of the column part so that the retainer segment guides the rollers. FIG. 42 is a sectional view showing one part of a retainer segment provided with guide clicks, taken from the inside of the pocket. Referring to FIG. 42, a retainer segment 121 includes a column part 122 to form a pocket, and a pair of connection parts 123a and 123b to connect the column parts 122. Two guide clicks 124a and 124b are provided at a side wall surface of the column part 122. The guide clicks 124a and 124b are arranged so as to be spaced in a roller length direction. According to the above constitution, lubricant oil can pass through a clearance 125 provided between the guide clicks 124a and 124b.

Meanwhile, since the plurality of retainer segments 121 are provided in the roller bearing, it is necessary to produce the retainer segments in large volume. Therefore, it is preferable that the retainer segment 121 is formed of a resin and produced by injection molding.

However, when the retainer segment 121 having the above configuration is produced by injection molding, shrinkage is generated at the tip ends of the guide clicks 124a and 124b, and the centers of the guide clicks 124a and 124b are recessed. This will be described with reference to FIG. 43. FIG. 43 is a view showing one part of the retainer segment 121 in this case. In addition, FIG. 43 is a view showing the retainer segment in FIG. 42 taken from a direction shown by an arrow XXXXIII in FIG. 42.

Referring to FIGS. 42 and 43, center parts 127a and 127b of the guide clicks 124a and 124b of the retainer segment 121 in the roller length direction are recessed due to shrinkage at the time of injection molding. Here, when a roller 131 starts to roll, edge parts 126a, 126b, 126c, and 126d positioned at both ends in the roller length direction are brought in contact with the roller 131. Accordingly, the edge parts 126a to 126d are worn and the postures of the roller 131 and the retainer segment 121 cannot be stable. In addition, in the case of the retainer segment 121 formed of the resin in which reinforced fiber is filled, the reinforced fiber exposes on its surface due to the abrasion of the resin part, which could cause the roller 131 to be worn. According to the roller bearing having such retainer segment 121, the roller cannot roll smoothly. In addition, as shown in FIG. 44, the same is true in the case where edge parts 126e and 126f in the guide clicks 124c and 124d are in contact with the roller 131.

In addition, since the retainer segment 121 having the above configuration is provided with the plurality of guide clicks, a number of edge parts 126a to 126d of the guide clicks 124a and 124b are provided. In this case, the fluidity of the resin material deteriorates at the time of the injection molding, and an internal defect is likely to be generated. In addition, like the retainer segment disclosed in the European Patent Publication No. 1408248A2, when the retainer segment has the complicated configuration in which the guide click is provided only on the large diameter side, and a part of the column part projects in a radial direction, its configuration could be deformed and not have the designed range in addition to the problem due to the shrinkage and expansion of the resin.

However, as described above, the retainer segment has the plurality of column parts extending in the direction along the rotation axis of the bearing so as to form the pockets to house the rollers, and the connection parts extending in the circumferential direction so as to connect the plurality of column parts, and the retainer segment guides the rollers, and the side wall surface of the column part is provided with the one guide click having the contact part with the roller, and the recess part is formed on the circumferential inner side of the contact part. Thus, since the one guide click is provided at the side wall surface of the column part in the retainer segment guiding the rollers, the number of the edge parts of the guide click can be reduced. Thus, since the above retainer segment is simple in configuration, a thickness difference is small, and the internal defect and the deformation at the time of the injection molding can be prevented. In addition, the contact area between the tip end of the guide click and the roller is increased and the surface pressure at the time of contact can be lowered. Furthermore, the rigidity of the column part and thus the retainer segment can be improved. According to the roller bearing having the above retainer segment, the postures of the roller and the retainer segment can be stable. In addition, since the recess part is positioned on the circumferential inner side of the contact part, the lubricant oil can pool in the recess part. Thus, since the lubricant oil can be supplied from the recess part to the contact part, the lubricating property is improved. Therefore, the retainer segment is prevented from being damaged and the roller can roll smoothly.

Preferably, the guide click is provided in the center of the side wall surface of the column part in a roller length direction. Thus, since the roller in the pocket and the guide click are in contact with each other in the center of roller length, the postures of the roller and the retainer segment can be stable. Therefore, the roller can roll more smoothly.

Further preferably, a length of the guide click in the roller length direction is roughly equal to an entire length of the pocket in the roller length direction. Thus, since the contact part of the roller and the guide click can be increased, the postures of the roller and the retainer segment can be more stable. Therefore, the roller can roll more smoothly. Here, it is to be noted that the term "roughly entire length" means at least 50% or more of the pocket length in the roller length direction and preferably, 75% or more thereof.

Further preferably, the recess part is formed by shrinkage generated when the retainer segment is molded. Since the recess part is continued to the surface of the guide click smoothly, the lubricant oil can easily flow in and flow out. In addition, since stress concentration is not likely to be generated at the recess part having such configuration, the damage can be reduced.

Further preferably, an angle at a corner part positioned at a tip end of the guide click is an obtuse angle in a section provided by cutting the retainer segment by a plane passing through the guide click and crossing a rotation axis of the bearing at right angles. Thus, the amount of the lubricant oil scraped off in the vicinity of the roller and the guide click of the retainer segment by the corner part positioned at the tip end of the guide click can be reduced. Thus, since the lubricant oil in the vicinity of the roller and the guide click can be easily supplied into the pocket, the lubrication defect is prevented and the roller can roll smoothly.

Further preferably, the corner part is chamfered. Thus, the amount of the lubricant oil scraped off by the corner part can be more reduced. Therefore, the roller can roll more smoothly.

Further preferably, the chamfered part is a R-chamfered part. Thus, since the corner part can become a smooth surface, the amount of the lubricant oil scraped off by the corner part can be more reduced. Therefore, the roller can roll more smoothly.

According to another aspect of the present invention, a retainer segment of a roller bearing for supporting a main shaft of a wind-power generator has a pocket to house a roller and it is arranged so as to be continuously lined in a circumferential direction, and is formed of a resin containing a filler material to lower a thermal linear expansion coefficient.

According to the retainer segment of the roller bearing for supporting the main shaft of the wind-power generator, since a difference in thermal linear expansion coefficient from the bearing component such as the outer ring composing the roller bearing for supporting the main shaft of the wind-power generator can be small, a change of the circumferential range of the clearance due to a temperature change can be small. Thus, the circumferential clearance between the retainer segments can be small and kept within the above range. Therefore, the function of the roller bearing having the above retainer segment can be prevented from being lowered.

Preferably, the filler material contains carbon fiber and/or glass fiber. Thus, the thermal expansion coefficient can be effectively lowered.

Further preferably, the resin is polyether ether ketone. Thus, the thermal expansion coefficient can be easily lowered with the filler material contained.

Further preferably, the thermal linear expansion coefficient of the resin is $1.3\times10^{-5}/C.°$ to $1.7\times10^{-5}/C.°$. Thus, the difference in thermal linear expansion coefficient from the bearing component such as the outer ring is allowable in the practical usage.

Further preferably, a filling rate of the filler material in the resin is 20% by weight to 40% by weight. Thus, the thermal linear expansion coefficient of the resin can be greatly lowered without generating other defects due to the filler material.

Further preferably, the retainer segment of the roller bearing for supporting the main shaft of the wind-power generator has a plurality of column parts extending along a rotation axis of the bearing so as to form pockets to house rollers, and a connection part extending in the circumferential direction so as to connect the plurality of column parts, and the retainer segment guides the rollers. One guide click having a contact part with the roller and a recess part formed on the circumferential inner side of the contact part are provided at a side wall surface of the column part.

According to the above retainer segment of the roller bearing, since only one guide click is provided at the side wall surface of the column part, the number of edge parts of the guide click can be reduced. Since the retainer segment has the above simple configuration, a thickness difference is small and an internal defect and deformation can be prevented from being generated at the time of injection molding. In addition, a contact area between the tip end of the guide click and the roller can be increased and a surface pressure at the time of contact can be lowered. Furthermore, the rigidity of the column part and thus the retainer segment can be improved. According to the roller bearing having the above retainer segment, the postures of the roller and the retainer segment can be stable. In addition, since the recess part is positioned on the circumferential inner side of the contact part, the lubricant oil can pool in the recess part. Thus, the lubricant oil can be supplied from the recess part to the contact part, the lubricating property is improved. Therefore, the retainer segment is prevented from being damaged and the roller can roll smoothly.

Preferably, the recess part is formed by shrinkage generated when the retainer segment is molded. Since the recess part is continued to the surface of the guide click smoothly, the lubricant oil can easily flow in and flow out. In addition, since stress concentration is not likely to be generated at the recess part having the above configuration, the damage can be reduced.

According to still another aspect of the present invention, a main shaft support structure of a wind-power generator includes a blade receiving wind power, a main shaft having one end fixed to the blade and rotating together with the blade, and a roller bearing assembled in a fix member to support the main shaft rotatably. The roller bearing has an outer ring, an inner ring, a plurality of rollers arranged between the outer ring and the inner ring, and a plurality of retainer segments each having a pocket to house the roller, and arranged so as to be continuously lined with each other in a circumferential direction between the outer ring and the inner ring. The retainer segment is formed of a resin containing a filler material to lower a thermal linear expansion coefficient. A clearance is provided between the first retainer segment and the last retainer segment after the plurality of retainer segments have been arranged in the circumferential direction without providing any clearance. A circumferential range of the clearance is larger than 0.075% of a circumference of a circle passing through a center of the retainer segment and smaller than 0.12% thereof at room temperature.

Since the main shaft support structure of the wind-power generator includes the roller bearing in which the function of the bearing is prevented from being lowered, the function of the main support structure of the wind-power generator itself can be prevented from being lowered.

Preferably, the retainer segment has a plurality of column parts extending along a rotation axis of the bearing so as to form pockets to house the rollers, and a connection part extending in the circumferential direction so as to connect the plurality of column parts, and the retainer segment guides the rollers, and one guide click having a contact part with the roller and a recess part formed on the circumferential inner side of the contact part are provided at a side wall surface of the column part.

Since the main shaft support structure of the wind-power generator includes the roller bearing in which the retainer segment is prevented from being damaged and the roller can roll smoothly, it has a long life.

According to the present invention, since the retainer segment is formed of the resin containing the filler material to lower the thermal linear expansion coefficient, and the circumferential clearance between the retainer segments is set within the above-described range, the defect in strength due to the collision of the retainer segments and the deformation due to the circumferential pressing between the retainer segments can be prevented. Therefore, the function of the roller bearing including such retainer segment can be prevented from being lowered.

In addition, according to the retainer segment of the roller bearing for supporting the main shaft of the wind-power generator, since the difference in thermal linear expansion coefficient from the bearing component such as the outer ring that composes the roller bearing for supporting the main shaft of the wind-power generator can be small, the change of the circumferential range of the clearance due to the temperature change can be small. Thus, the circumferential clearance between the retainer segments can be small and kept within the set range. Therefore, the function of the roller bearing including such retainer segment can be prevented from being lowered.

In addition, since the main shaft support structure of the wind-power generator includes the roller bearing in which the function is prevented from being lowered, the function of the main support structure of the wind-power generator itself can be prevented from being lowered.

BEST MODE FOR CARRYING OUT THE INVENTION

Figure 2:
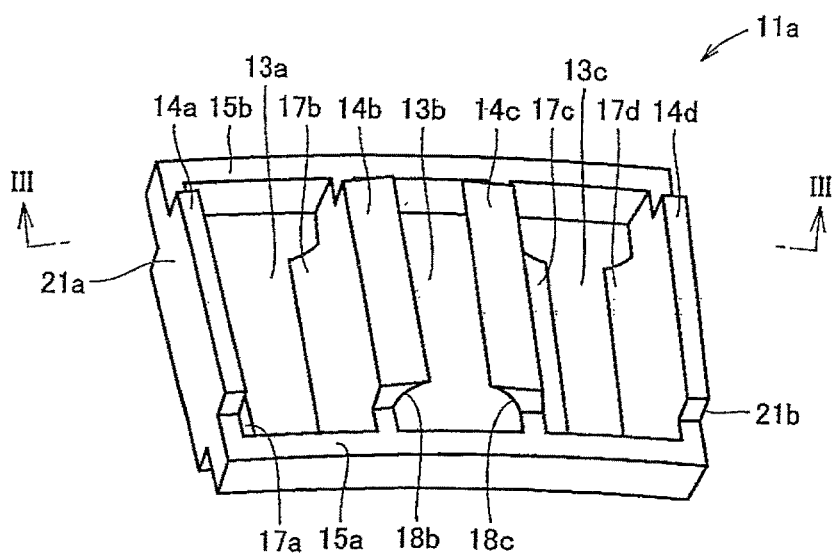
FIG. 2 is a perspective view showing the retainer segment contained in the tapered roller bearing according to the one embodiment of the present invention.
Figure 3:
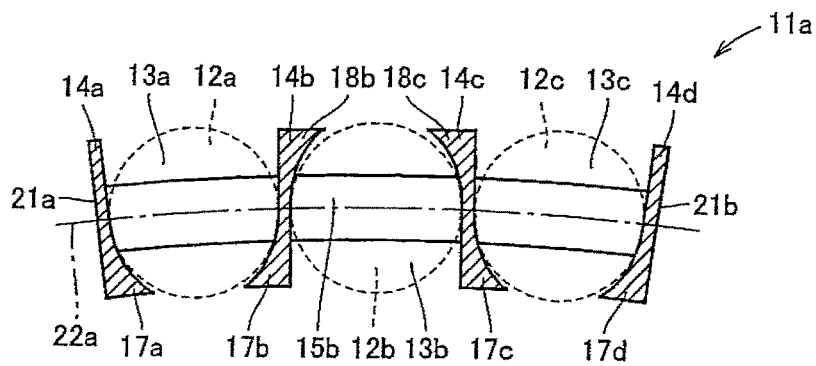
FIG. 3 is a sectional view showing the retainer segment in FIG. 2 cut by a plane passing through a line III-III in FIG. 2 and crossing a rotation axis of the bearing at right angles.
Figure 4:
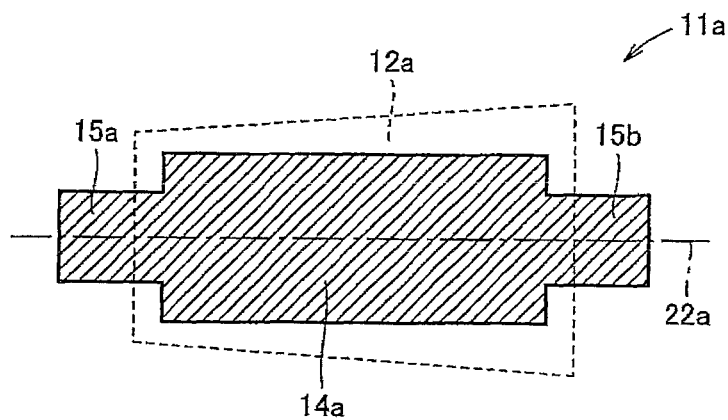
FIG. 4 is a sectional view showing the retainer segment in FIG. 2 cut by a plane passing through the center of a column part and crossing a circumferential direction at right angles.

Embodiments of the present invention will be described with reference to the drawing hereinafter. FIG. 2 is a perspective view showing a retainer segment 11a provided in a tapered roller bearing according to one embodiment of the present invention, to support a main shaft of a wind-power generator. FIG. 3 is a sectional view showing the retainer segment 11a shown in FIG. 2 cut by a plane containing a line III-III in FIG. 2 and crossing a rotation axis of the bearing at right angles. FIG. 4 is a sectional view showing the retainer segment 11a shown in FIG. 2 cut by a plane passing through the center of a column part 14a and crossing a circumferential direction at right angles. In addition, a plurality of tapered rollers 12a, 12b, and 12c retained by the retainer segment 11a are shown by dotted lines in FIGS. 3 and 4 so as to be easily understood. In addition, a PCD 22a is shown by a one-dot chain line.

First, a constitution of the retainer segment 11a contained in the tapered roller bearing will be described with reference to FIGS. 2 to 4. The retainer segment 11a is a segment of one annular retainer split by a split line extending along the rotation axis of the bearing so as to have at least one pocket to contain the roller. The retainer segment 11a includes four column parts 14a, 14b, 14c, and 14d extending along the rotation axis of the bearing, and a pair of connection parts 15a and 15b positioned at axial both ends and extending in a circumferential direction so as to connect the four column parts 14a to 14d so that pockets 13a, 13b, and 13c to hold the tapered rollers 12a, 12b, 12c, and 12d are formed. Here, according to the retainer segment 11a, the column parts 14a and 14d are positioned at its circumferential outer side ends.

The connection parts 15a and 15b have predetermined curvature radiuses in the circumferential direction so that the plurality of retainer segments 11a are arranged so as to be continuously lined with each other in the circumferential direction to form one annular retainer when assembled in the tapered roller bearing. According to the connection parts 15a and 15b, the curvature radius of the connection part 15a positioned on a small diameter side of the tapered rollers 12a to 12c is smaller than the curvature radius of the connection part 15b positioned on a large diameter side of the tapered rollers 12a to 12c.

According to the column parts 14a and 14b positioned on circumferential both sides of the pocket 13a, and the column parts 14c and 14d positioned on circumferential both sides of the pocket 13c, guide clicks 17a, 17b, 17c, and 17d are provided on the inner diameter side of the side wall surface of the column parts 14a to 14d to regulate the movement of the retainer segment 11a toward the radial outer side. The guide clicks 17a to 17d are in contact with the tapered rollers 12a and 12c held in the pockets 13a and 13c, on the inner diameter side. In addition, according to the column parts 14b and 14c positioned on circumferential both sides of the pocket 13b, guide clicks 18b and 18c are provided on the outer diameter side of the side wall surfaces of the column parts 14b and 14c to regulate the movement of the retainer segment 11a toward the radial inner side. The guide clicks 18b and 18c are in contact with the tapered roller 12b held in the pocket 13b, on the outer diameter side. Each of the guide clicks 17a to 17d, 18b, and 18c projects toward the pockets 13a to 13c. In addition, as shown in the section in FIG. 3, each guide surface of the guide clicks 17a to 17d, 18b, and 18c is arc-shaped in section to follow each rolling surface of the tapered rollers 12a to 12c. Thus, since the guide clicks 17a to 17d, 18b, and 18c are provided on the inner diameter side and the outer diameter side, the rollers are in contact with the guide surfaces of the guide clicks 17a to 17d, 18b, and 18c and the retainer segment 11a guides the rollers. In addition, end faces 21a and 21b provided on the circumferential outer sides of the column parts 14a and 14d positioned on the circumferential outer sides are flat.

Here, the retainer segment 11a is formed of a resin containing a filler material to lower a thermal linear expansion coefficient. Thus, since a difference in thermal linear expansion coefficient from a bearing component such as an outer ring in the roller bearing for supporting a main shaft of a wind-power generator can be small as will be described below, a dimensional change of a circumferential clearance due to a temperature change can be small.

In addition, the resin is preferably PEEK. Since the thermal linear expansion coefficient of PEEK itself is about $4.7 \times 10^{-5}/°C.$, and the thermal linear expansion coefficient is low as compared with other resin materials, the thermal linear expansion coefficient can be easily lowered by containing the filler material.

In addition, it is preferable that the filler material contains carbon fiber and/or glass fiber. Since such filler material is in a fibrous form, the thermal linear expansion coefficient, that is, a thermal expansion coefficient can be lowered effectively.

In addition, it is preferable that the thermal linear expansion coefficient of the resin is $1.3 \times 10^{-5}/°C.$ to $1.7 \times 10^{-5}/°C.$ The bearing component such as the outer ring in the bearing is formed of steel such as case hardening steel in general. The thermal linear expansion coefficient of such steel is about $1.12 \times 10^{-5}/°C.$ Therefore, when the thermal linear expansion coefficient of the resin is within the above range, the difference in thermal linear expansion coefficient from the bearing component such as the outer ring is allowable in practical usage.

In addition, it is preferable that a filling rate of the filler material in the resin is 20% by weight to 40% by weight. Thus, the thermal expansion coefficient of the resin can be considerably lowered without generating another trouble due to filling of the filler material, such as strength poverty due to excessive filling amount.

In addition, since the plurality of retainer segments 11a are provided in one tapered roller bearing, its productivity is required to be improved. Thus, according to the above constitution, the retainer segment having the same configuration can be easily produced in large numbers by injection molding and the like.

Figure 5:
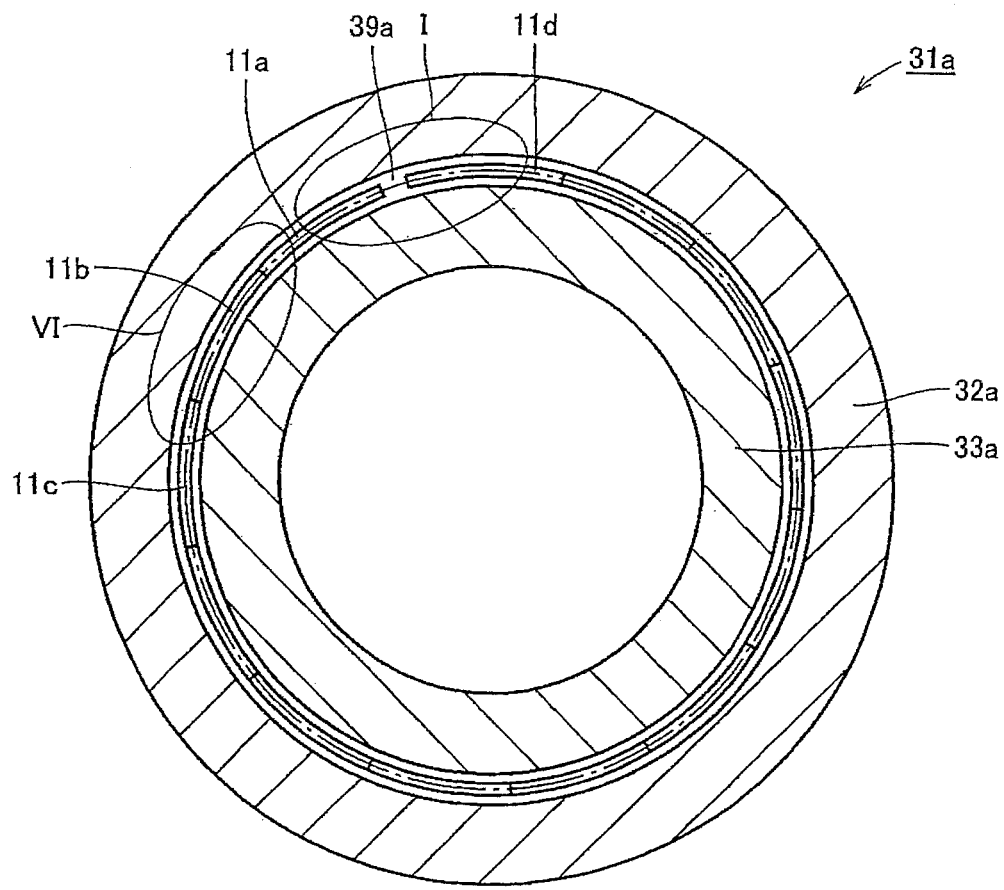
FIG. 5 is a schematic sectional view showing the tapered roller bearing in which the plurality of retainer segments are arranged in the circumferential direction.
Figure 6:
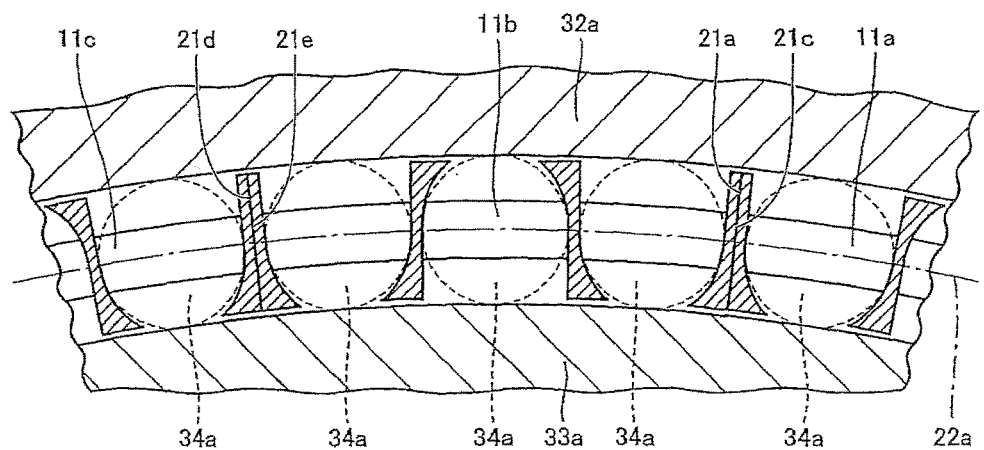
FIG. 6 is an enlarged sectional view showing adjacent retainer segments.

Here, more specifically, it is preferable that the retainer segment 11a contains 30% by weight of carbon fiber as the filler material and is formed of PEEK having the linear expansion coefficient of $1.5 \times 10^{-5}/°C.$ The above retainer segment 11a is considerably different from a retainer segment formed of PEEK having a thermal linear expansion coefficient of $4.7 \times 10^{-5}/°C.$, and a retainer segment formed of PPS having a thermal linear expansion coefficient of $5.0 \times 10^{-5}/°C.$ Next, a description will be made of a constitution of the tapered roller bearing containing the above retainer segment 11a. FIG. 5 is a schematic sectional view showing a tapered roller bearing 31a in which the plurality of retainer segments 11a, 11b, 11c, and 11d are arranged in the circumferential direction, taken from an axial direction. In addition, FIG. 6 is an enlarged view showing a part VI in FIG. 5. Here, since the retainer segments 11b, 11c, and 11d have the same configuration and are formed of the same material as the retainer segment 11a, their descriptions will be omitted. In addition, in FIG. 5, the tapered roller retained in the retainer segment 11a is omitted. In addition, it is to be noted that the retainer segment arranged first is the retainer segment 11a, and the retainer segment arranged last is the retainer segment 11d among the plurality of retainer segments 11a to 11d.

Referring to FIGS. 5 and 6, the tapered roller bearing 31a includes an outer ring 32a, an inner ring 33a, a plurality of tapered rollers 34a, and the plurality of retainer segments 11a to 11d. The retainer segments 11a to 11d are arranged so as to be continuously lined with each other in the circumferential direction with no clearance. Here, the retainer segment 11a is arranged first, and then the retainer segment 11b is arranged such that the retainer segment 11b abuts on the retainer segment 11a, that is, such that the end face 21a of the retainer segment 11a abuts on an end face 21c of the retainer segment 11b. Then, the retainer segment 11c is arranged such that it abuts on the retainer segment 11b, that is, such that an end face 21d of the retainer segment 11b abuts on an end face 21e of the retainer segment 11c, and similarly the retainer segments are arranged so as to be continuously lined with each other, and the retainer segment 11d is arranged last. Thus, the retainer segments 11a to 11d are arranged so as to be continuously lined with each other in the circumferential direction. In this case, a circumferential clearance 39a is provided between the first retainer segment 11a and the last retainer segment 11d.

Figure 1:
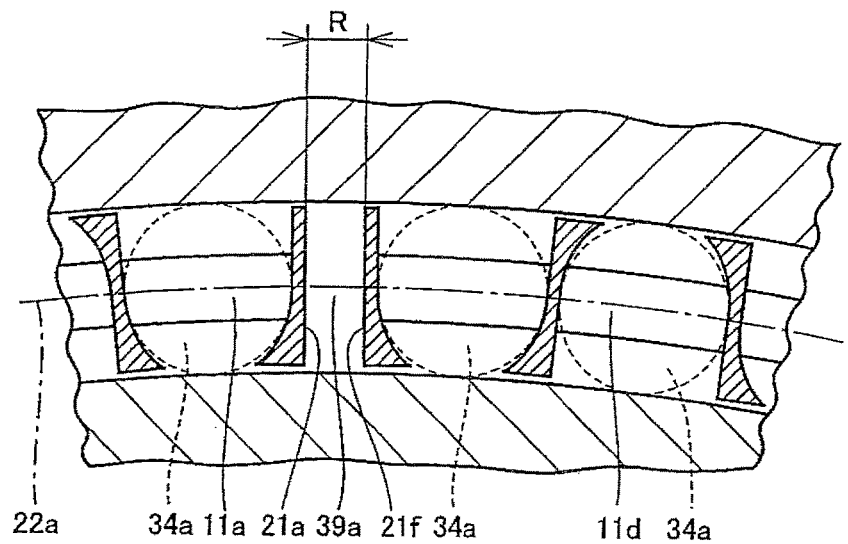
FIG. 1 is an enlarged sectional view showing a clearance between a first retainer segment and a last retainer segment in a tapered roller bearing according to one embodiment of the present invention.

Next, a description will be made of the circumferential clearance between the first retainer segment 11a and the last retainer segment 11d. FIG. 1 is an enlarged sectional view showing a part I in FIG. 5. Here, a circumferential range R of the clearance 39a is to be larger than 0.075% of the circumference of a circle passing through the center of the retainer segments 11a to 11d but smaller than 0.12% thereof. In this case, the circumferential range R of the clearance 39a can be limited to the above range by adjusting the circumferential lengths of the retainer segments 11a to 11d, or by cutting an end face 21f of the last retainer segment 11d after the retainer segments 11a to 11c have been arranged so as to be continuously lined with each other.

Figure 7:
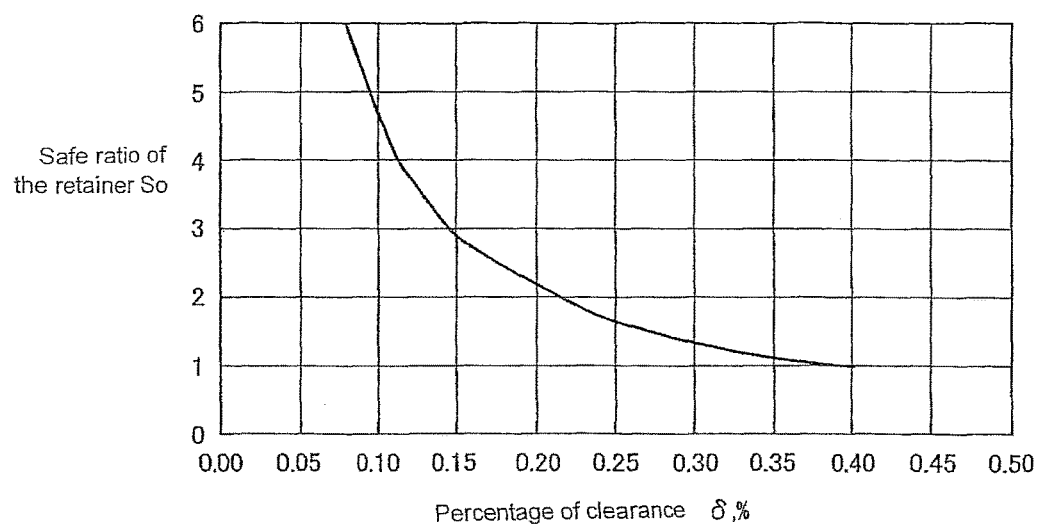
FIG. 7 is a graph showing a relation between a safe ratio of a retainer and a circumferential range of a clearance.

FIG. 7 is a graph showing a relation between a safe ratio of the retainer and a circumferential range of a clearance 39a. Referring to FIGS. 1 and 7, the safe ratio of the retainer composed of the plurality of retainer segments 11a to 11d is required to be 4.0 or more in view of fatigue strength of the material of the retainer segments 11a to 11d and stress generated in the retainer segments 11a to 11d. Here, when the circumferential range of the clearance 39a is set to be smaller than 0.12% of the circumference, the safe ratio can be surely 4.0 or more. Thus, a problem in strength due to collision among the retainer segments 11a to 11d can be avoided.

Here, a linear expansion coefficient Kb of the retainer segment 11a is about $1.5 \times 10^{-5}/°C$. Meanwhile, since the bearing component such as the outer ring is formed of case-hardening steel, its linear expansion coefficient Ka is about $1.12 \times 10^{-5}/°C$. When it is assumed that a temperature rise is $\Delta t$ and a difference in expansion amount between the above components is $\delta$, the difference $\delta$ is expressed by a formula 1.

$$\delta = 2\pi r \cdot (Kb - Ka) \cdot \Delta t \quad \text{[Formula 1]}$$

In this case, even when it is assumed that only the retainer segment 11a is raised to 50° C., the difference $\delta$ in expansion amount is 0.075%. In addition, even when the tapered roller bearing is heated such that $\Delta t = 100°$ C. at the time of shrink fitting, the difference $\delta$ in expansion amount is 0.035%. Therefore, the difference in expansion amount between the bearing components such as the outer ring 32a and the inner ring 33a, and the retainer segments 11a to 11d is allowable by setting the clearance to be larger than 0.075% in practical usage. Thus, the state in which the circumferential range of the clearance 39a shows a negative value and the retainer segments 11a to 11d push each other can be avoided. Thus, the retainer segments 11a to 11d can be prevented from being deformed due to pushing.

As described above, as the retainer segments 11a to 11d are formed of the resin containing the filler material to lower the thermal linear expansion coefficient, and the circumferential clearance 39a between the retainer segments 11a and 11d is within the above range, the trouble in strength due to collision of the retainer segments 11a to 11d, and deformation of the retainer segments 11a to 11d due to circumferential pushing can be prevented. Therefore, the function of the tapered roller bearing 31a having the above retainer segments 11a to 11d can be prevented from being lowered.

In addition, according to the above retainer segments 11a to 11d, since the difference in thermal linear expansion coefficient from the bearing component such as the outer ring 32a in the tapered roller bearing 31a can be small, the dimensional change of the circumferential clearance 39a due to the temperature change can be small. Thus, the circumferential clearance 39a between the retainer segments 11a and 11d can be maintained within the set range. Therefore, the function of the tapered roller bearing 31a provided with the retainer segments 11a to 11d can be prevented from being lowered.

In addition, an intermediate element to adjust the circumferential range R of the clearance 39a may be provided between the first retainer segment 11a and the last retainer segment 11d so as to abut on the last retainer segment 11d. In this case, the clearance 39a is generated between the intermediate element and the first retainer segment 11a. In this constitution, the circumferential range of the clearance 39a between the first retainer segment 11a and the last retainer segment 11d can be more easily within the above range. In addition, in this case, the intermediate element is to be regarded as the retainer segment. In addition, since the circumferential range of the intermediate element is very small as compared with the circumferential range of the arranged retainer segments 11a to 11d, the intermediate element may be formed of the same material as that of the retainer segments 11a to 11d, or metal, or a resin.

Figure 8:
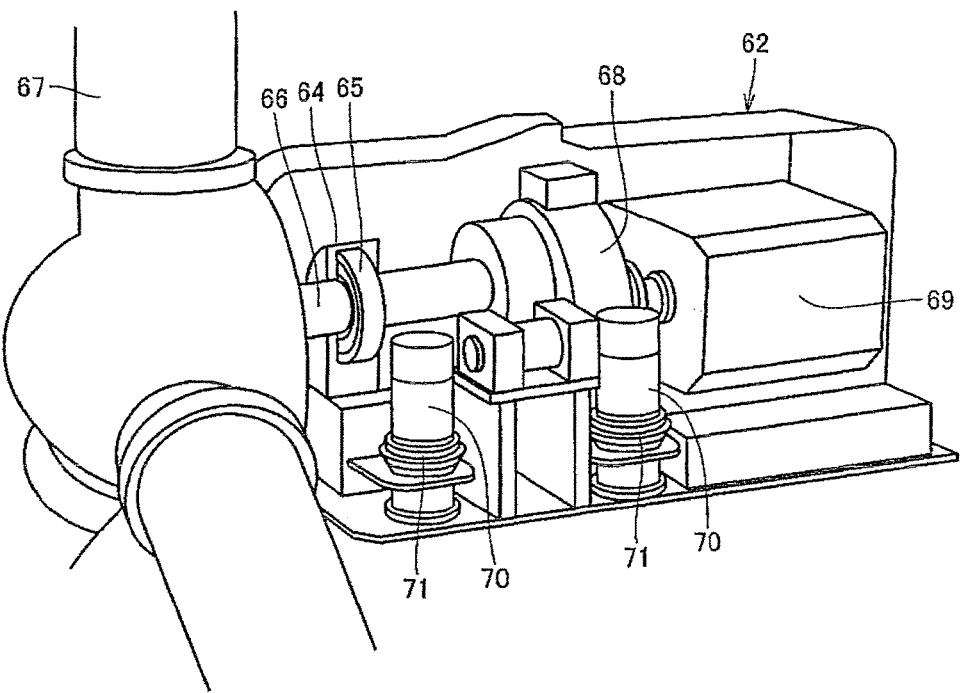
FIG. 8 is a view showing one example of a main shaft support structure of a wind-power generator including the tapered roller bearing according to the present invention.
Figure 9:
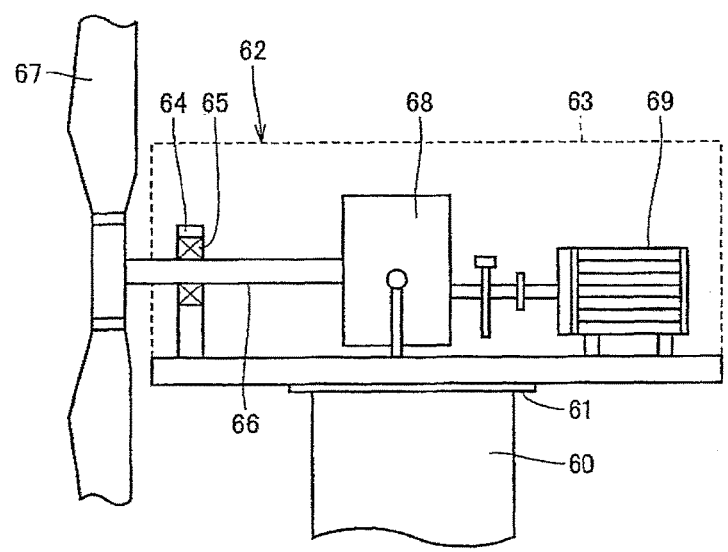
FIG. 9 is a schematic side view showing the main shaft support structure of the wind-power generator shown in FIG. 8.

FIGS. 8 and 9 show one example of the main shaft support structure of the wind power generator, in which the tapered roller bearing according to one embodiment of the present invention is applied as a main shaft support bearing 75. A casing 63 of a nacelle 62 for supporting the main part of the main shaft support structure is put on a support table 60 through a slewing bearing 61 at a high position so as to be horizontally turned. A blade 67 receiving wind power is fixed to one end of a main shaft 66. The main shaft 66 is rotatably supported in the casing 63 of the nacelle 62 through a main shaft support bearing 65 incorporated in a bearing housing 64, and the other end of the main shaft 66 is connected to a speed-up gear 68, and an output shaft of the speed-up gear 68 is coupled to a rotor shaft of a generator 69. The nacelle 62 is turned in any angle by a rotation motor 70 through a speed-down gear 71.

The main shaft support bearing 65 assembled in the bearing housing 64 is the tapered roller bearing according to one embodiment of the present invention, and it has the outer ring, the inner ring, the plurality of tapered rollers arranged between the outer ring and the inner ring, and the plurality of retainer segments having the pocket to house the tapered roller and arranged so as to be continuously lined with each other in the circumferential direction between the outer ring and the inner ring. The retainer segment is formed of the resin containing the filler material to lower the thermal linear expansion coefficient. After the plurality of retainer segments have been arranged in the circumferential direction with no clearance, the clearance is provided between the retainer segment arranged first and the retainer segment arranged last. Here, at room temperature, the circumferential range of the clearance is larger than 0.075% of the circumference of the circle passing through the center of the retainer segments and smaller than 0.12% thereof.

Since the main shaft support bearing 65 supports the main shaft 66 having one end to which the blade 67 receiving high wind power is fixed, it needs to receive high moment load, thrust load, and radial load. Here, when the roller is the tapered roller, the bearing can receive the high moment load and the like.

In addition, according to the main shaft support structure of the above wind-power generator, since the tapered roller bearing having the function prevented from being lowered is contained, the function of the main shaft support structure of the wind-power generator itself can be prevented from being lowered.

In addition, although the circumferential range of the clearance is larger than 0.075% of the circumference of the circle passing through the center of the retainer segments and smaller than 0.12% thereof at room temperature in the above embodiment, the circumferential range of the clearance may be larger than 0.075% of the circumference of the circle passing through the center of the retainer segments and smaller than 0.10% thereof. In this case, since the safe ratio of the retainer can be 6.0 or more, the deformation due to collision can be further prevented.

In addition, although the filler material contained in the resin is composed of carbon fiber only to be used as the material of the retainer segment in the above embodiment, a filler material may be composed of glass fiber only. Instead, a filler material may contain carbon fiber and glass fiber. In addition, a powdery filler material such as carbon black or a granular filler material may be used.

In addition to the above constitution, the retainer segment may have the plurality of column parts extending along the rotation axis of the bearing so as to form the pockets to hold the rollers, and the connection parts extending in the circumferential direction so as to connect the plurality of column parts, and the retainer segment guides the rollers, and one guide click having the contact part with the roller and a recess part formed at the contact part on the circumferential inner side may be provided at the side wall surface of the column part.

Figure 10:
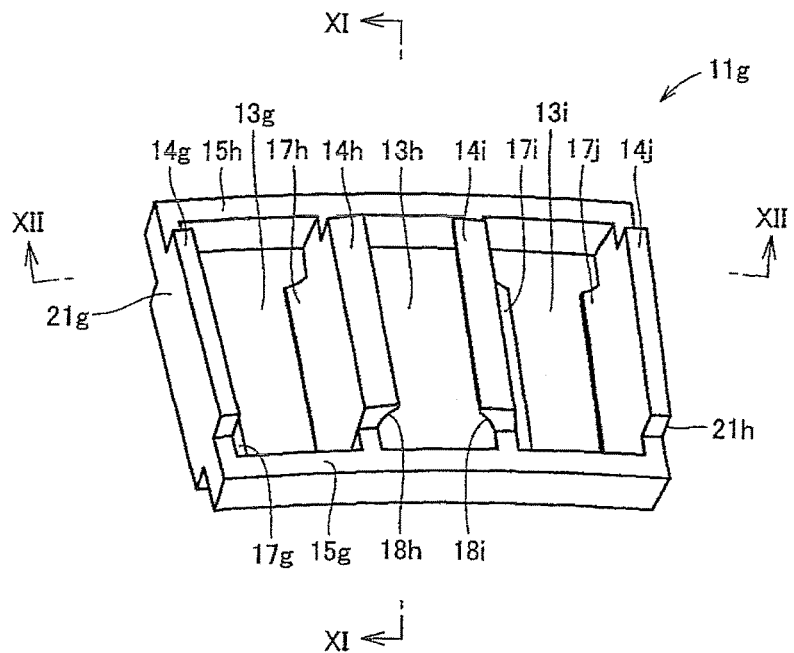
FIG. 10 is a perspective view showing a retainer segment in a tapered roller bearing according to another embodiment of the present invention.
Figure 11:
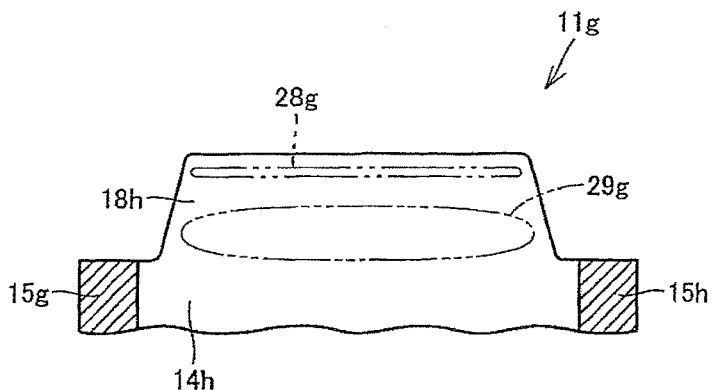
FIG. 11 is a sectional view showing a part of the retainer segment contained in the tapered roller bearing according to another embodiment of the present invention taken from the inner side of a pocket.
Figure 12:
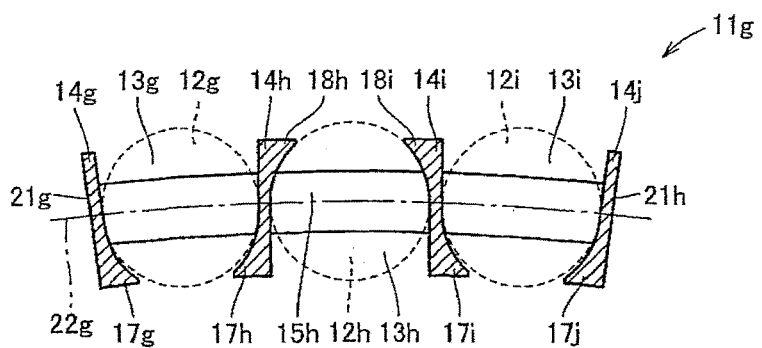
FIG. 12 is a sectional view showing the retainer segment shown in FIG. 10 cut by a plane passing through a line XI-XI in FIG. 10 and crossing a shaft at right angles.
Figure 13:
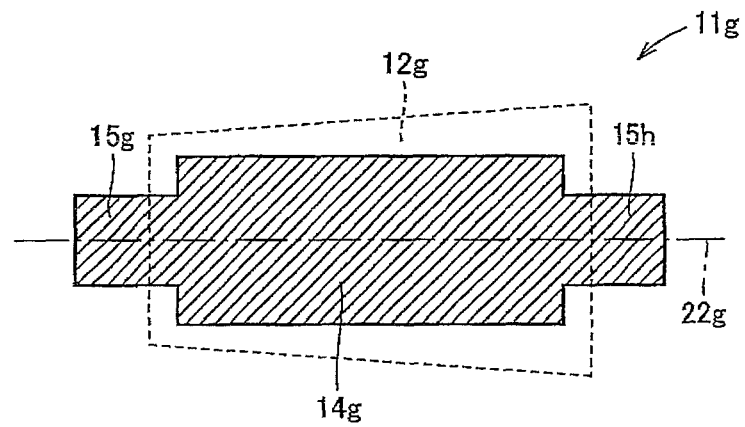
FIG. 13 is a sectional view showing the retainer segment shown in FIG. 10 cut by a plane passing through the center of a column part and crossing a circumferential direction at right angles.
Figure 14:
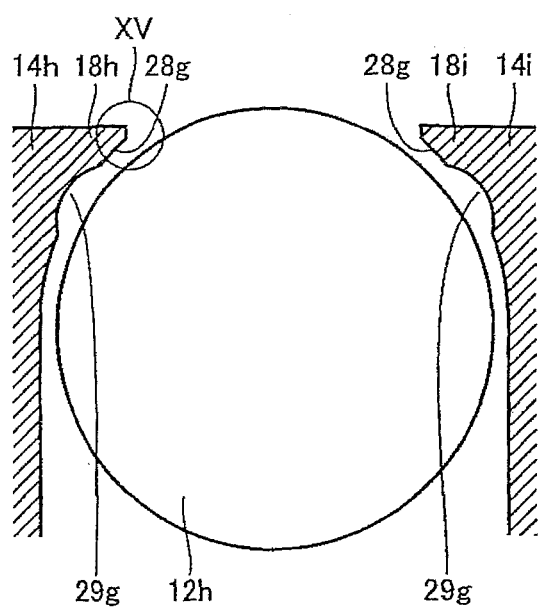
FIG. 14 is an enlarged sectional view showing a pocket part of the retainer segment shown in FIG. 12.

FIG. 10 is a perspective view showing a retainer segment 11g provided in a tapered roller bearing according to another embodiment of the present invention. FIG. 11 is a sectional view showing the retainer segment 11g in FIG. 10 cut along a line XI-XI in FIG. 10. FIG. 12 is a sectional view showing the retainer segment 11g in FIG. 10 cut by a plane containing a line XII-XII in FIG. 10 and crossing the rotation axis of the bearing at right angles. FIG. 13 is a sectional view showing the retainer segment 11g in FIG. 10 cut by a plane passing through the center of the column part 14g and crossing the circumferential direction at right angles. FIG. 14 is an enlarged sectional view showing a pocket of the retainer segment 11g in FIG. 12. In addition, tapered rollers 12g, 12h, and 12i held by the retainer segment 11g are shown by a dotted line in FIGS. 12 and 13, and shown by a solid line in FIG. 14 to be easily understood. In addition, the recess part that will be described below is not shown in FIGS. 10 and 12. In addition, a PCD 22g is shown by a one-dot chain line.

A constitution of the retainer segment 11g contained in the tapered roller bearing will be described with reference to FIGS. 10 to 14. The retainer segment 11g is a segment of one annular retainer split by a split line extending along the rotation axis of the bearing and has at least one pocket to contain the roller. The retainer segment 11g includes four column parts 14g, 14h, 14i, and 14j extending along the rotation axis of the bearing, and a pair of connection parts 15g and 15h positioned at axial both ends and extending in a circumferential direction so as to connect the four column parts 14g to 14j so that pockets 13g, 13h, and 13i to hold the tapered rollers 12g, 12h, and 12i are formed. Here, according to the retainer segment 11g, the column parts 14g and 14h are positioned at its circumferential outer side ends.

The connection parts 15g and 15h have predetermined curvature radiuses in the circumferential direction so that the plurality of tapered rollers 11g are arranged so as to be continuously lined with each other in the circumferential direction to form one annular retainer after assembled in the tapered roller bearing. According to the connection parts 15g and 15h, the curvature radius of the connection part 15g positioned on a small diameter side of the tapered rollers 12g to 12i is smaller than the curvature radius of the connection part 15h positioned on a large diameter side of the tapered rollers 12g to 12i.

According to the column parts 14g and 14h positioned on circumferential both sides of the pocket 13g, and the column parts 14i and 14j positioned on circumferential both sides of the pocket 13i, guide clicks 17g, 17h, 17i, and 17j are provided on the inner diameter side of the side wall surfaces of the column parts 14g to 14j to regulate the movement of the retainer segment 11g toward the radial outer side. The guide clicks 17g to 17j are in contact with the tapered rollers 12g and 12i held in the pockets 13g and 13i, on the inner diameter side. In addition, according to the column parts 14h and 14i positioned on circumferential both sides of the pocket 13h, guide clicks 18h and 18i are provided on the outer diameter side of the side wall surfaces of the column parts 14h and 14i to regulate the movement of the retainer segment 11g toward the radial inner side. The guide clicks 18h and 18i are in contact with the tapered roller 12h held in the pocket 13h, on the outer diameter side. The guide clicks 17g to 17j, 18h, and 18i are provided at the side wall surfaces of the column parts 14g to 14j, respectively. The guide clicks 17g to 17j, 18h, and 18i project toward the pockets 13g to 13i, respectively. In addition, as shown in the section in FIG. 12, each guide surface of the guide clicks 17g to 17j, 18h, and 18i is arc-shaped in section to follow each rolling surface of the tapered rollers 12g to 12i. The length of the guide clicks 17g to 17j, 18h, and 18i in the roller length direction is a little shorter than the length of the pockets 13g to 13i in the roller length direction, and provided over almost an entire length of the pockets 13g to 13i in the roller length direction. In addition, the guide clicks 17g to 17j, 18h, and 18i are not provided at one-sided position to the connection part 15g or the connection part 15h, but positioned in the center in the roller length direction, at the side wall surfaces of the column parts 14g to 14j. In addition, end faces 21g and 21h provided on the circumferential outer side of the column parts 14g and 14j positioned on the circumferential outer side are flat.

Thus, since the guide clicks 17g to 17j, 18h, and 18i are provided on the inner diameter side and the outer diameter side, the retainer segment 11g can guide the rollers such that the rollers are in contact with contact parts 28g of the guide surfaces of the guide clicks 17g to 17j, 18h, and 18i.

At the side wall surface of the column part 14h provided with the guide click 18h, a recess part 29g is formed by shrinkage generated when the retainer segment 11g is molded and positioned on the circumferential inner side of the contact part 28g that is in contact with the tapered roller 12h (refer to FIGS. 11 and 14). The recess part 29g can be easily formed at the time of injection molding without performing a post-process. More specifically, a mold configuration is made to be recessed at a part corresponding to the contact part 28g taking the shrinkage into consideration. Thus, the contact part 28g becomes flat due to the shrinkage, and the recess part 29g is generated on the circumferential inner side of the contact part 28g due to the shrinkage. Thus, the retainer segment 11g is produced. In this case, since only one guide click 18h is provided at the side wall surface of the column part 14h, the recess part 29g is generated at the position described above due to the shrinkage. In addition, according to the recess part 29g formed as described above, its surface roughness is different from that of a recess part formed by a machining process after the injection molding. In addition, the recess parts 29g are also positioned on the circumferential inner side of the contact parts that are in contact with the tapered rollers at the side wall surfaces of the column parts 14g to 14j in which the guide clicks 17g to 17j are provided on the inner diameter side and the guide click 18i is provided on the outer diameter side. Since their constitutions are the same as the above, their description will be omitted. In addition, the recessed amount of the recess part 29g is shown in FIG. 13 with exaggeration to be easily understood.

According to the retainer segment 11g, since the guide clicks 17g to 17j, 18h, and 18i are provided at the side wall surfaces of the column parts 14g to 14j, respectively, the number of the edge parts of the guide clicks 17g to 17j, 18h, and 18i can be small. Since the retainer segment 11g has the simple configuration, its thickness difference is small and the internal defect and deformation are prevented from being generated at the time of injection molding. In addition, since contact areas between the tip ends of the guide clicks 17g to 17j, 18h, and 18i and the tapered rollers 12g to 12i can be large, a surface pressure at the time of contact can be lowered. Furthermore, the rigidity of the column parts 14g to 14j and thus the retainer segment 11g can be high. According to the roller bearing having the retainer segment 11g, the postures of the tapered rollers 12g to 12j and the retainer segment 11g can be stable. In addition, since the recess part 29g is positioned on the circumferential inner side of the contact part 28g, lubricant oil can pool in the recess part 29g. Thus, since the lubricant oil can be supplied from the recess part 29g to the contact part, lubricating properties can be improved. Therefore, the retainer segment 11g can be prevented from being damaged, and the tapered rollers 12g to 12i can roll smoothly.

In addition, since the recess part 29g is smoothly continued to the surfaces of the guide clicks 17g to 17j, 18h, and 18i, the lubricant oil can be easily flow in and flow out. In addition, since stress concentration is not likely to be generated in the recess part 29g having the above configuration, damage can be reduced.

In addition, since the length of the guide clicks 17g to 17j, 18h, and 18i in the roller length direction is roughly equal to the entire length of the pockets 13g to 13i in the roller length direction, the contact parts 28 between the tapered rollers 12g to 12i and the guide clicks 17g to 17j, 18h, and 18i can be large, so that the postures of the tapered rollers 12g to 12i and the retainer segment 11g can be stabilized. Therefore, the tapered rollers 12g to 12i can roll smoothly. Furthermore, since the guide clicks 17g to 17j, 18h, and 18i are provided in the center of the side wall surfaces of the column parts 14g to 14j in the roller length direction, they are in contact with the tapered rollers 12g to 12i contained in the pockets 13g to 13i, in the center of the roller length, so that the postures of the tapered rollers 12g to 12i and the retainer segment 11g can be more stabilized. Therefore, the tapered rollers 12g to 12i can roll smoothly.

Figure 15:
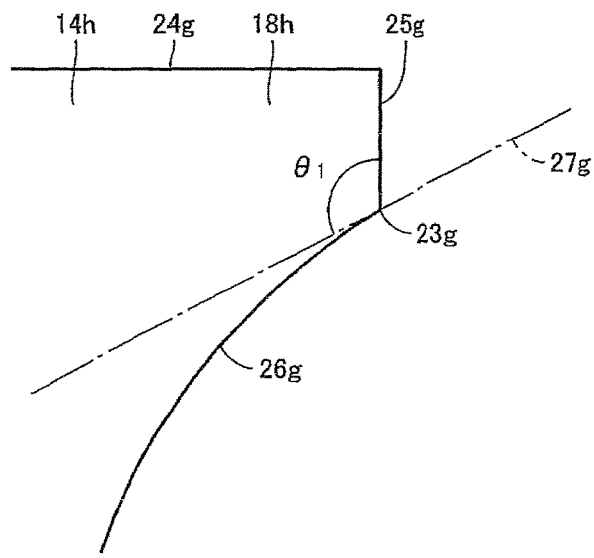
FIG. 15 is an enlarged sectional view showing a corner part of a guide click provided in the retainer segment.

Here, the configuration of the guide click 18h on the outer diameter side will be described in more detail. FIG. 15 is an enlarged sectional view showing a part XV in FIG. 14. Referring to FIGS. 10 to 15, an angle of a corner part 23g of the guide click 18h positioned in the pocket 13h is made to be an obtuse angle. More specifically, in the section shown in FIG. 15, that is, in the section cut by a plane passing through the guide click 18h and crossing the rotation axis of the bearing at right angles, an angle $\theta_1$ formed by a line of a surface 25g extending from an outer diameter surface 24g of the column part 14h toward the inner side of the pocket 13h so as to form the corner part 23g, and a line of a tangential surface 27g at the corner part 23g in an arc-shaped guide surface 26g constituting the guide click 23g is made to be more than 90°.

When the angle of the corner part 23g is an acute angle, a large amount of lubricant oil in the vicinity of the tapered roller 12h and the guide click 18h is scraped off at the time of the rolling of the tapered roller 12h. In this case, the lubricant oil is not likely to be supplied from the outer side of the retainer segment 11g to the pocket 13h, which causes a lubrication defect and hinders the smooth rolling of the tapered roller 12h.

However, since the corner part 23g positioned at the tip end of the guide click 18h has the obtuse angle, the scraped amount of the lubricant oil in the vicinity of the tapered roller 12h and the guide click 18h can be small at the time of the rolling of the tapered roller 12h. Thus, the lubricant oil in the vicinity of the tapered roller 12h and the guide click 18h can be likely to be supplied to the pocket 13h, and the lubrication defect is prevented. Therefore, the tapered roller 12h can roll smoothly. In addition, since the guide clicks 17g to 17j on the inner diameter side and the guide click 18i on the outer diameter side have the same constitution, their description will be omitted.

Figure 16:
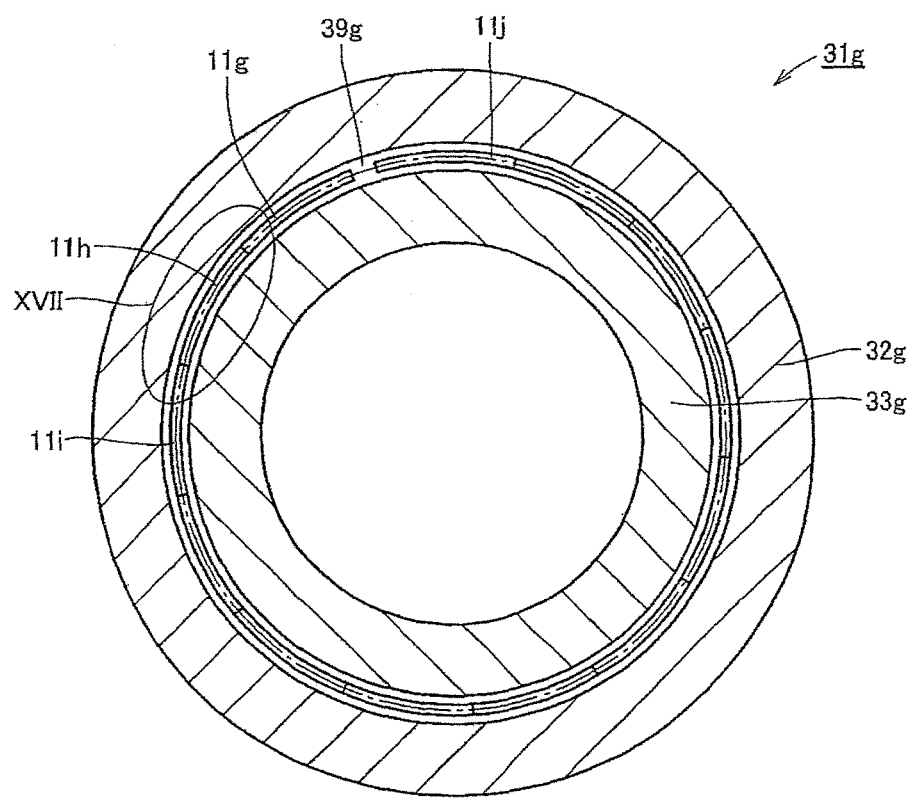
FIG. 16 is a schematic sectional view showing a tapered roller bearing in which the plurality of retainer segments are arranged in the circumferential direction.
Figure 17:
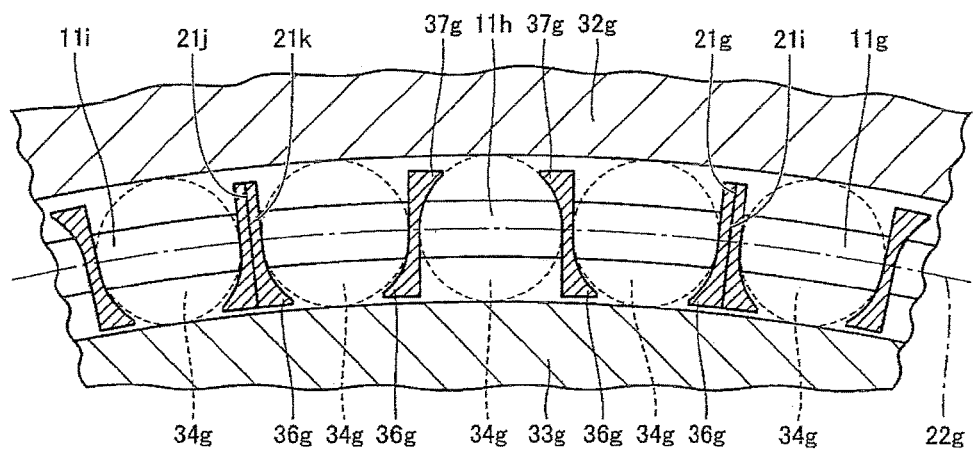
FIG. 17 is an enlarged sectional view showing the adjacent retainer segments.

Next, a description will be made of a constitution of the tapered roller bearing containing the retainer segment 11g. FIG. 16 is a schematic sectional view showing a tapered roller bearing 31g in which the plurality of retainer segments 11g, 11h, 11i, and 11j are arranged in a circumferential direction, taken from an axial direction. In addition, FIG. 17 is an enlarged sectional view showing a part XVII in FIG. 16. Here, since the retainer segments 11h, 11i, and 11j have the same configuration as the retainer segment 11g, their description will be omitted. In addition, in FIG. 16, the tapered roller held in the retainer segment 11g is omitted, and in FIGS. 16 and 17, the recess part provided at the side wall surface of the column part is omitted. In addition, here, it is assumed that the retainer segment arranged first is the retainer segment 11g, and the retainer segment arranged last is the retainer segment 11j among the plurality of retainer segments 11g to 11j.

Referring to FIGS. 16 and 17, the tapered roller bearing 31g includes an outer ring 32g, an inner ring 33g, a plurality of tapered rollers 34g, and the plurality of retainer segments 11g to 11j. The retainer segments 11g to 11j are arranged so as to be continuously lined with each other in the circumferential direction with no clearance. Here, the retainer segment 11g is arranged first, and then the retainer segment 11h is arranged such that the retainer segment 11h abuts on the retainer segment 11g, that is, such that the end face 21g of the retainer segment 11h abuts on an end face 21i of the retainer segment 11h. Then, the retainer segment 11i is arranged such that it abuts on the retainer segment 11h, that is, such that an end face 21*j* of the retainer segment 11*h* abuts on an end face 21*k* of the retainer segment 11*i*, and similarly the retainer segments are arranged so as to be continuously lined with each other, and the retainer segment 11*j* is arranged last. Thus, the retainer segments 11*g* to 11*j* are arranged so as to be continuously lined with each other in the circumferential direction. In this case, a circumferential clearance 39*g* is provided between the first retainer segment 11*g* and the last retainer segment 11*j*. The clearance 39*g* is provided taking the thermal expansion of the retainer segments 11*g* to 11*j* into consideration.

Here, as described above, since the shrinkage is not likely to be generated at the tip ends of guide clicks 36*g* and 37*g* provided at the side wall surfaces of the column parts, the rigidity of the column part is high, and a surface pressure at the time of contact can be lowered by increasing the contact areas between the tip ends of the guide clicks 36*g* and 37*g*, and the tapered roller 34*g*. In addition, lubricant oil can be supplied from the recess part positioned on the circumferential inner side of the contact part to the contact part, so that lubrication properties can be improved. Since the recess part is smoothly continued to each surface of the guide clicks 36*g* and 37*g*, the lubricant oil can be easily flow in and flow out. In addition, since stress concentration is not likely to be generated in the recess part having the above configuration, damage can be reduced. Therefore, the retainer segment 11*h* is prevented from being damaged and the tapered roller 34*g* can roll smoothly.

Furthermore, an angle of a corner part positioned at the tip ends of the guide clicks 36*g* and 37*g* provided in the retainer segment 11*h* is an obtuse angle. Thus, the scraped amount of the lubricant oil in the vicinity of the tapered roller 34*g* and the guide clicks 36*g* and 37*g* by the corner part positioned at the tip ends of the guide clicks 36*g* and 37*g* can be reduced at the time of the rolling of the tapered roller 34*g*. Thus, the lubricant oil in the vicinity of the tapered roller 34*g* and the guide clicks 36*g* and 37*g* can be likely to be supplied to the pocket, and the lubrication defect is prevented.

In addition, the corner parts of the guide clicks 36*g* and 37*g* may be chamfered. In this case, the scraped amount of the lubricant oil at the corner part can be further reduced. Therefore, the tapered roller 34*g* can roll more smoothly.

Figure 18:
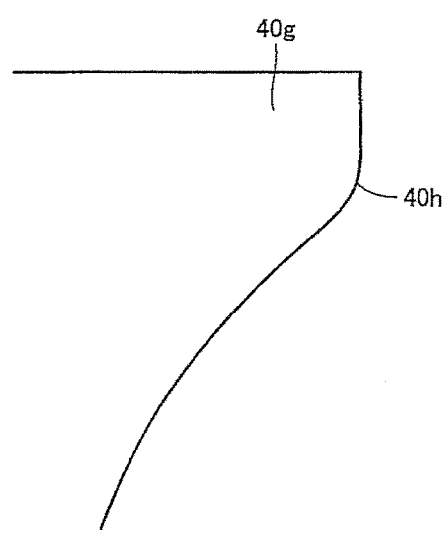
FIG. 18 is an enlarged sectional view showing a corner part of a guide click provided in the retainer segment according to another embodiment of the present invention.

Furthermore, as shown in FIG. 18, a corner part 42*g* of a guide click 41*g* may be R-chamfered. In this case, since the corner part 42*g* becomes smoother, the scraped amount of the lubricant oil can be further reduced.

In addition, the retainer segment guiding the rollers may have a constitution in which one guide click is provided in the center of the side wall surface of the column part in a roller length direction, and the recess part positioned on the circumferential inner side of the contact part of the guide click is formed by the shrinkage. In addition, the retainer segment guiding the rollers may have a constitution in which one guide click having a length roughly equal to the entire length of the pocket in the roller length direction is provided at the side wall surface of the column part, and the recess part positioned on the circumferential inner side of the contact part of the guide click is formed by the shrinkage. In addition, the retainer segment guiding the rollers may have a constitution in which one guide click having the corner part at its tip end made to have the obtuse angle is provided at the side wall surface of the column part, and the recess part positioned on the circumferential inner side of the contact part of the guide click is formed by the shrinkage. In addition, the corner part may be chamfered and the chamfered part may be R-chamfered.

In addition, although the recess part formed on the circumferential inner side of the contact part is formed by use of the shrinkage in the above embodiment, the recess part may be formed on the circumferential inner side of the contact part by a machining process.

In addition, the tapered roller bearing may be applied to the main shaft support bearing of the main shaft support structure of the wind-power generator shown in FIGS. 8 and 9.

More specifically, the main shaft support bearing assembled in the bearing housing is the tapered roller bearing according to another embodiment of the present invention, and includes the outer ring, the inner ring, and the plurality of tapered rollers arranged between the outer ring and the inner ring, and the plurality of retainer segments having the plurality of column parts extending along the rotation axis of the bearing so as to form the pockets to house the tapered rollers, and the connection part extending in the circumferential direction so as to connect the plurality of column parts, and arranged so as to be continuously lined with each other in the circumferential direction between the outer ring and the inner ring. The retainer segment guides the rollers. Here, one guide click having the contact part with the tapered roller, and the recess part formed on the circumferential inner side of the contact part are provided at the side wall surface of the column part.

Since the main shaft support bearing supports the main shaft having one end to which the blade receiving high wind power is fixed, it needs to receive high moment load, thrust load, and radial load. Here, when the roller is the tapered roller, the bearing can receive the high moment load and the like.

In addition, since the main shaft support structure of the wind-power generator has the tapered roller bearing in which the retainer segment is prevented from being damaged and the tapered roller roll smoothly, it has a long life.

Next, when the above tapered roller bearing is a double-row tapered roller bearing, an assembling method of the double-row tapered roller bearing in the rotation shaft will be described.

In general, when a large tapered roller bearing is assembled in the rotation shaft extending in a vertical direction, the inner ring is arranged with its large-diameter side end face down, and the tapered roller and the retainer are arranged on a track surface of the inner ring. Then, the inner ring having the tapered roller and the retainer are hoisted with a crane and the like to be assembled in the rotation shaft.

Here, when the inner ring is hoisted with its small-diameter side end face down, the tapered roller and the retainer escape from the inner ring. In this case, according to a retainer composed of one annular part, the tapered roller can be prevented from escaping by connecting the inner ring and the retainer fixedly. However, the above-described retainer segments are arranged in the circumferential direction and each of them is an independent member. Thus, since it is necessary to connect the inner ring and each retainer segment fixedly to prevent the tapered roller from escaping, a large amount of labor is required. As a result, it becomes difficult to assemble the inner ring having the tapered roller and the retainer, in the rotation shaft, so that the productivity of the tapered roller bearing is lowered.

Here, a double-row tapered roller bearing according to still another embodiment of the present invention may be constituted as follows.

Figure 19:
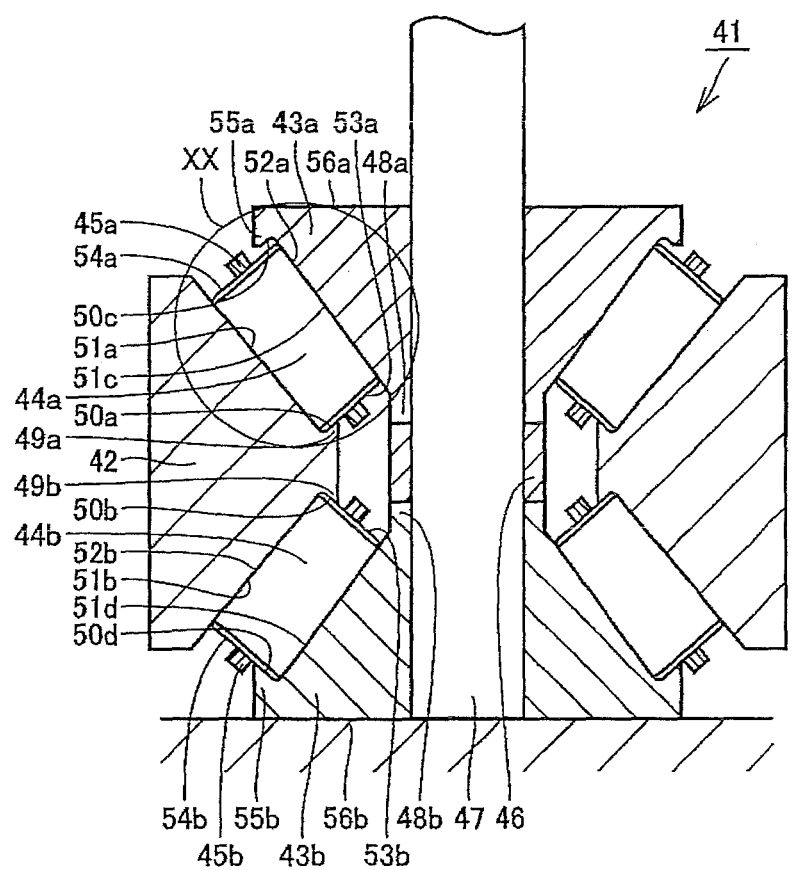
FIG. 19 is a sectional view showing a double-row tapered roller bearing according to still another embodiment of the present invention.
Figure 20:
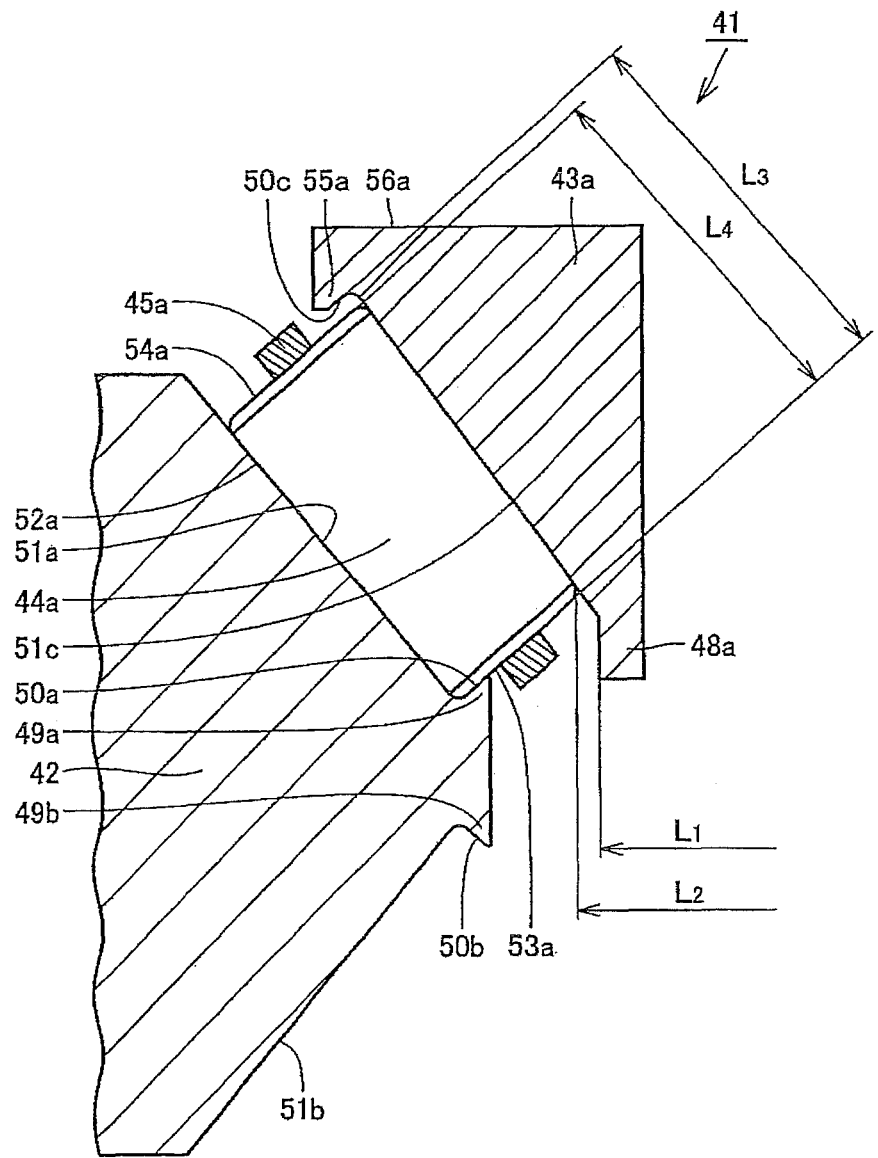
FIG. 20 is an enlarged view showing one part of the double-row tapered roller bearing shown in FIG. 19.

FIG. 19 is a sectional view showing the double-row tapered roller bearing according to still another embodiment of the present invention. FIG. 20 is an enlarged sectional view showing a part XX in FIG. 19. Referring to FIGS. 19 and 20, a double-row tapered roller bearing 41 includes an outer ring 42, two inner rings 43a and 43b arranged such that small-diameter side ends 48a and 48b are opposed, a plurality of tapered rollers 44a and 44b arranged between the outer ring 42 and the inner rings 43a and 43b, a plurality of retainer segments 45a and 45b retaining the tapered rollers 44a and 44b, respectively as described above and an intermediate element (not shown), and an inner ring intermediate element 46 arranged between the inner ring 43a and the inner ring 43b.

Two track surfaces 51a and 51b are provided at the outer ring 42. In addition, the inner rings 43a and 43b have track surfaces 51c and 51d, respectively. The tapered roller 44a is arranged between the outer ring 42 and the inner ring 43a such that its rolling surface 52a abuts on the track surfaces 51a and 51c. Similarly, the tapered roller 44b is arranged between the outer ring 42 and the inner ring 43b such that its rolling surface 52b abuts on the track surfaces 51b and 51d.

Here, the outer ring 42 has small flanges 49a and 49b at the small-diameter side ends of the tapered rollers 44a and 44b. When the double-row tapered roller bearing 41 is assembled, guide surfaces 50a and 50b of the small flanges 49a and 49b can abut on small end faces 53a and 53b of the tapered rollers 44a and 44b, respectively. In addition, it is preferable that the guide surface 50a is roughly orthogonal to the track surface 51a, or roughly parallel to the small end face 53a after the tapered roller 44a has been arranged. Similarly, it is preferable that the guide surface 50b is roughly orthogonal to the track surface 51b, or roughly parallel to the small end face 53b after the tapered roller 44b has been arranged.

The inner ring 43a has a large flange 55a at the large-diameter side end of the tapered roller 44a but does not have a small flange at the small-diameter side end 48a. More specifically, although the large flange 55a is provided at the large-diameter side end of the inner ring 43a, the small flange is not provided at the small-diameter side end 48a of the inner ring 43a. A maximum outer diameter $L_1$ of the small-diameter side end 48a of the inner ring 43a is not more than an inscribed circle diameter $L_2$ of the tapered roller 44a (refer to FIG. 20). In addition, the inner ring 43b has a large flange 55b at the large-diameter side end of the tapered roller 44b but does not have a small flange at the small-diameter side end 48b similar to the inner ring 43a.

Figure 21:
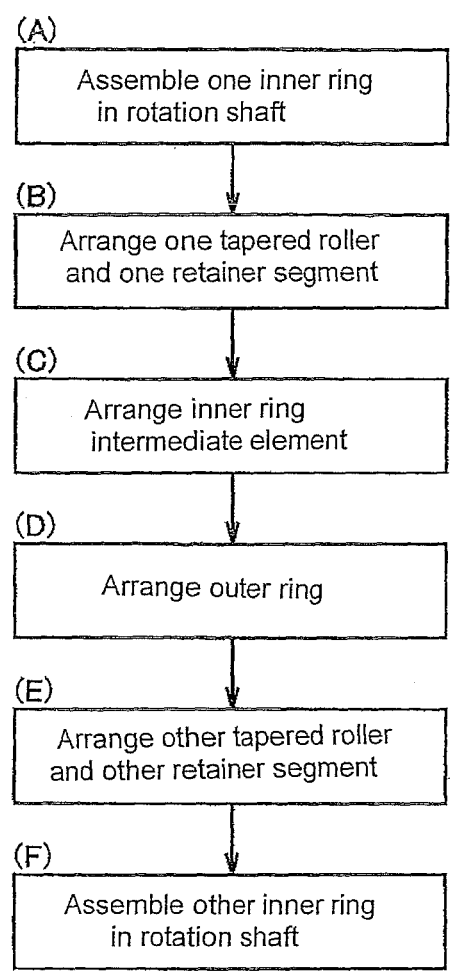
FIG. 21 is a flowchart roughly showing a method for assembling the double-row tapered roller bearing shown in FIG. 19.

FIG. 21 is a flowchart showing procedures when the double-row tapered roller bearing 41 shown in FIGS. 19 and 20 is assembled in a rotation shaft 47. In addition, FIGS. 22 to 26 are sectional views showing arrangement of members in the processes. A description will be made of an assembling method for assembling the above double-row tapered roller bearing 41 in the rotation shaft 47.

Figure 22:
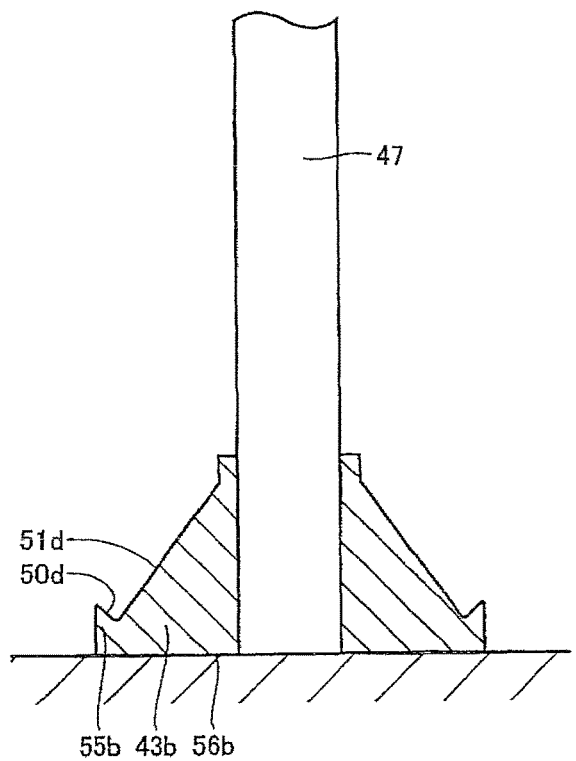
FIG. 22 is a sectional view showing a state in which one inner ring is assembled in a rotation shaft.
Figure 23:
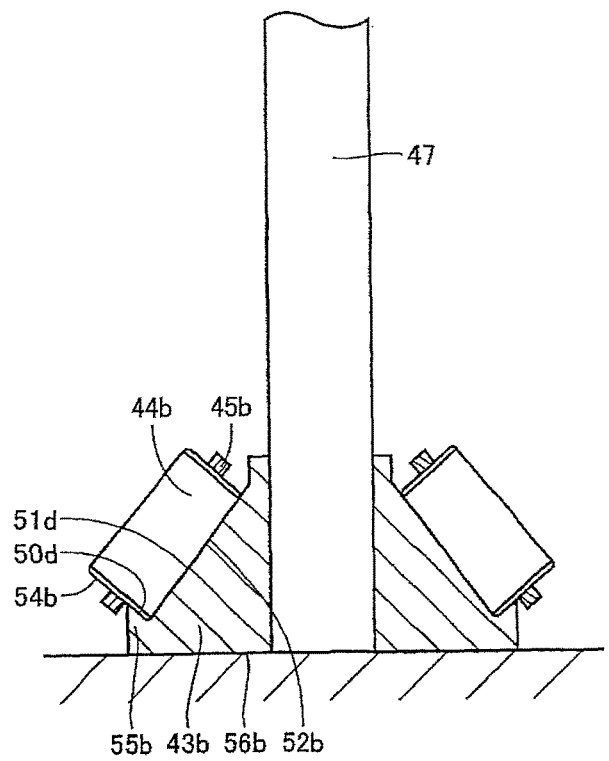
FIG. 23 is a sectional view showing a state in which one tapered roller and one retainer segment are arranged.

First, one inner ring 43b is assembled in the rotation shaft 47 with a large-diameter side end face 56b down (FIG. 21(A) and FIG. 22). Then, the tapered roller 44b and the retainer segment 45b are arranged such that the track surface 51d of the inner ring 43b abuts on the rolling surface 52b of the tapered roller 44b, and the guide surface 50d of the large flange 55b of the inner ring 43b abuts on a large end face 54b of the tapered roller 44b (FIG. 21(B) and FIG. 23). The tapered roller 44b and the retainer segment 45b are arranged on a track surface 51d of the inner ring 43b such that the plurality of retainer segments 45b are arranged so as to be continuously lined with each other in the circumferential direction as described above (FIG. 21(B) and FIG. 23).

Then, an intermediate element is arranged between the first retainer segment 45b and the last retainer segment 45b. In this case, since the large end face 54b of the tapered roller 44b is arranged so as to abut on the guide surface 50d of the large flange 55b of the inner ring 43b, the large end face 54b is caught by the large flange 55b, so that the arrangement of the tapered roller 44b and the retainer segment 45b is fixed.

Figure 24:
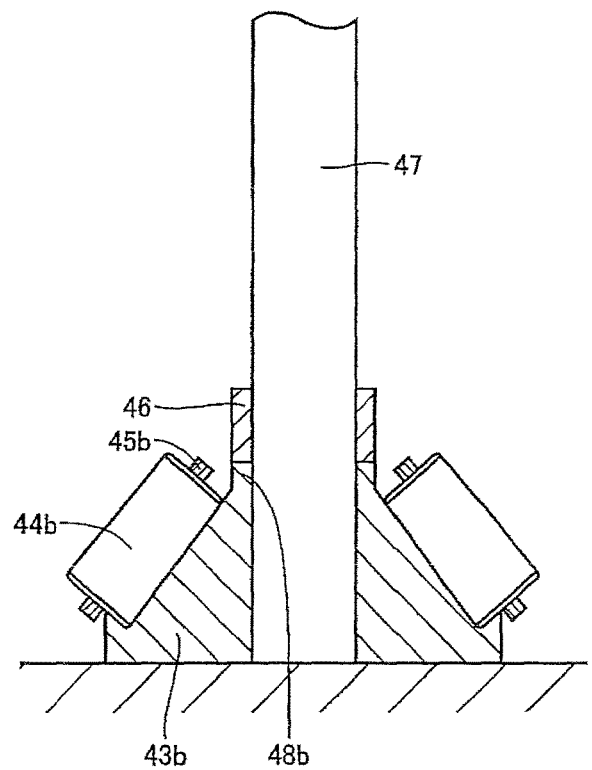
FIG. 24 is a sectional view showing a state in which an inner ring intermediate element is arranged.

Then, the inner ring intermediate element 46 is assembled in the rotation shaft 47 from the above so as to abut on the small-diameter side end 48b of the inner ring 43b (FIG. 21(C) and FIG. 24).

Figure 25:
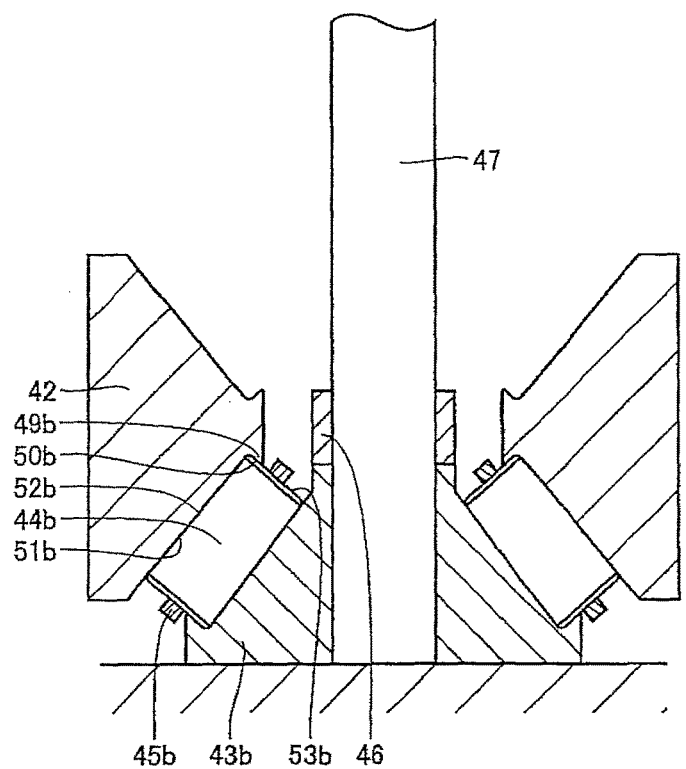
FIG. 25 is sectional view showing a state in which an outer ring is arranged.

Then, the outer ring 42 is arranged from the above such that the rolling surface 52b of the tapered roller 44b abuts on the track surface 51b of the outer ring 42, and the guide surface 50b of the small flange 49b abuts on the small end face 53b of the tapered roller 44b (FIG. 21(D) and FIG. 25). In this case, since the small flange 49b is caught by the small end face 53b of the tapered roller 44b, the arrangement of the outer ring 42 is fixed.

Figure 26:
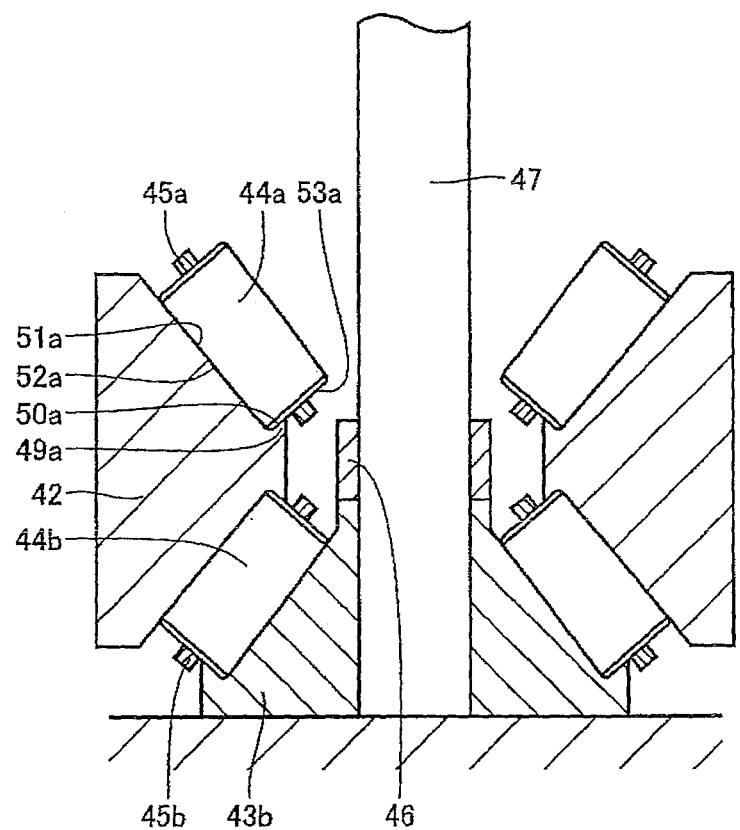
FIG. 26 is a sectional view showing a state in which the other tapered roller and the other retainer segment are arranged.

Then, the tapered roller 44a and the retainer segment 45a are arranged such that the track surface 51a of the outer ring 42 abuts on the track surface 52a of the tapered roller 44a, and the guide surface 50a of the small flange 49a abuts on the small end face 53a of the tapered roller 44a (FIG. 21(E) and FIG. 26). In this case also, the retainer segments 45a and the like are arranged so as to be continuously lined with each other in the circumferential direction. In addition, in this case also, since the small end face 53a of the tapered roller 44a is caught by the small flange 49a, the arrangement of the tapered roller 44a and the retainer segment 45a is fixed.

Then, the inner ring 43a is assembled in the rotation shaft 47 from the above with a large-diameter end face 56a of the inner ring 43a up such that the rolling surface 52a of the tapered roller 44a abuts on the track surface 51c of the inner ring 43a (FIG. 21(F) and FIGS. 19 and 20). In this case, since the small flange is not provided at the small-diameter side end 48a of the inner ring 43a, the tapered roller 44a and the inner ring 43a do not interfere with each other. In addition, since the maximum outer diameter $L_1$ of the small-diameter side end 48a of the inner ring 43a is not more than the inscribed circle diameter $L_2$ of the tapered roller 44a, when the inner ring 43a is assembled in the rotation shaft 47, the small-diameter side end 48a of the inner ring 43a does not interfere with the tapered roller 44a.

In addition, although the small end faces 53a and 53b of the tapered rollers 44a and 44b abut on the guide surfaces 50a and 50b of the small flanges 49a and 49b in the assembled state, when a load is applied to the double-row tapered roller bearing 41, an induced thrust load is generated, and large end faces 54a and 54b of the tapered rollers 44a and 44b abut on guide surfaces 50c and 50d of the large flanges 55a and 55b.

According to the above constitution, an assembling property of the double-row tapered roller bearing 41 is improved. Consequently, according to the assembling method of the above double-row tapered roller bearing 41, the arrangement of the tapered roller 44a and the retainer segment 45a can be prevented from collapsing, due to the small flange 49a provided at the outer ring 42. In addition, since the small flange is not provided in the small-diameter side end 48a of the inner ring 43a, the inner ring 43a and the tapered roller 44a do not interfere with each other when the inner ring 43a is assembled. Therefore, the assembling property is improved.

In addition, it is preferable that a distance $L_3$ between the guide surface 50c of the large flange 55a of the inner ring 43a and the guide surface 50a of the small flange 49a in the roller length direction is longer than a length $L_4$ of the tapered roller 44a (refer to FIG. 20). Thus, since the rolling surface 52a of the tapered roller 44a can appropriately abut on the track surfaces 51a and 51c of the outer ring 42 and the inner ring 43a, respectively, the load can be received by the tapered roller 44a appropriately. In addition, it is preferable that a length between the guide surface 50d of the large flange 55b and the guide surface 50b of the small flange 49b, and the length of the tapered roller 44b have the same relation as described above.

Figure 27:
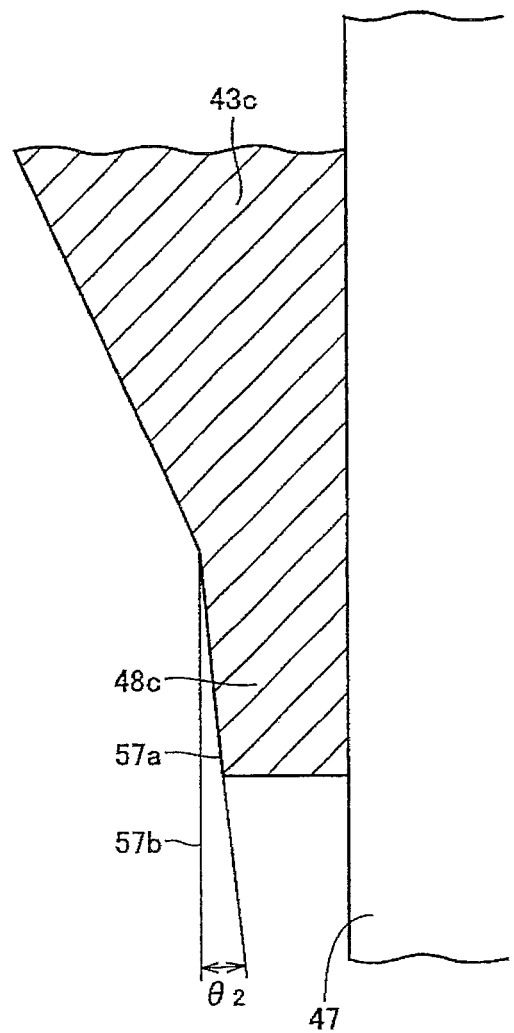
FIG. 27 is an enlarged sectional view showing one part of an inner ring contained in the double-row tapered roller bearing according to another embodiment of the present invention.

In addition, it is preferable that the outer diameter of the small-diameter side end of the inner ring is decreased toward its tip end. For example, it is preferable that an angle formed between a line of the outer diameter surface at the small-diameter side end and the rotation center axis is more than 0° in a section passing through the rotation center axis FIG. 27 is an enlarged sectional view showing the vicinity of a small-diameter side end of an inner ring contained in the double-row tapered roller bearing. The section shown in FIG. 27 passes through the rotation center axis. Referring to FIG. 27, it is preferable that an angle $\theta_2$ formed between a line 57a of an outer diameter surface at a small-diameter side end 48c and a line 57b parallel to the rotation center axis is more than 0°. Thus, the outer diameter of the small-diameter side end 48c of an inner ring 43c can be decreased toward the tip end. Therefore, the inner ring 43c can be smoothly assembled when the inner ring 43c is assembled in the rotation shaft 47. In addition, the outer diameter surface may be composed of a plurality of flat surfaces and curved surfaces to decrease the outer diameter toward the tip end.

Figure 28:
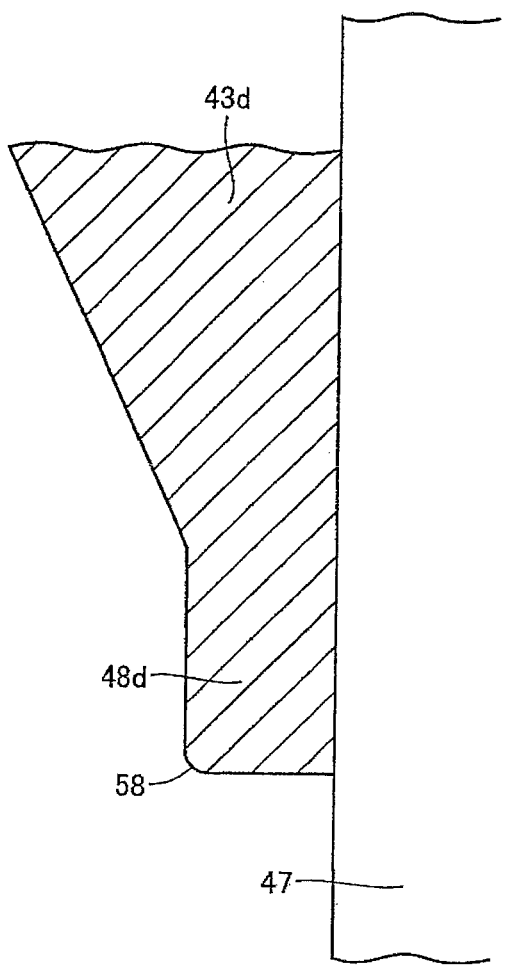
FIG. 28 is an enlarged sectional view showing one part of an inner ring contained in the double-row tapered roller bearing according to still another embodiment of the present invention.

In addition, a corner part of the outer diameter surface of the small-diameter side end of the inner ring may be chamfered. FIG. 28 is an enlarged sectional view showing one part of an inner ring in this case, and corresponds to FIG. 27. Referring to FIG. 28, a corner part 58 of an outer diameter surface of a small-diameter side end 48d of an inner ring 43d is chamfered so as to have a R configuration in sectional view. Thus, when the inner ring 43d is assembled in the rotation shaft 47, its handling property and assembling property are improved. In addition, the corner part may be C-chamfered.

In addition, the above tapered roller bearing may be applied to the main shaft support bearing of the main shaft support structure of the wind-power generator shown in FIGS. 8 and 9.

More specifically, the main shaft support bearing 65 assembled in the bearing housing 64 is the tapered roller bearing according to still another embodiment of the present invention, and it has the tapered rollers, the outer ring having the small flange at the small-diameter side end of the tapered roller, the inner ring not having the small flange at the small-diameter side end of the tapered roller, and the plurality of retainer segments having at least one pocket to hold the tapered roller, and split in the circumferential direction.

Since the main shaft support bearing 65 supports the main shaft 66 having one end fixed to the blade 67 receiving great wing power, a high load is applied to it, so that the bearing itself has to be large. Here, since the retainer is the split type and has the above constitution, the tapered roller bearing can be easily assembled in the main shaft. Therefore, the productivity of the main shaft support structure of the wind-power generator can be improved.

In addition, although the double-row tapered roller bearing is used in the above embodiment, the present invention is not limited to this, so that a single-row tapered roller bearing may be used. In addition, although the above tapered roller bearing includes the intermediate element, the present invention is not limited to this, so that the tapered roller bearing may not include the intermediate element. In addition, although the retainer segment contained in the tapered roller bearing has the configuration split by the split line extending along the shaft in the above, the retainer segment may have any configuration split in the circumferential direction.

In addition, the tapered roller bearing according to still another embodiment of the present invention may have a configuration in which it includes the inner ring, the outer ring, the plurality of tapered rollers having the rolling surfaces that are in contact with the inner ring and the outer ring, and the plurality of retainer segments having the plurality of column parts extending along the shaft so as to form the pockets to hold the tapered rollers and the connection parts extending in the circumferential direction so as to connect the plurality of column parts, and arranged so as to be continuously lined with each other in the circumferential direction between the inner ring and the outer ring, and when it is assumed that a roller diameter of the tapered roller at a certain position of the rolling surface is D, and a distance between the track surfaces of the inner ring and the outer ring at the measurement position of the roller diameter of the tapered roller is d, a relation D>d is satisfied in at least one position of the rolling surface of each tapered roller.

When the distance d between the track surfaces is smaller than the diameter D at any position of the tapered roller bearing in the circumferential direction (this relation is referred to as the "negative clearance" hereinafter), the tapered roller is prevented from slipping laterally, and its rotation movement and revolution movement become smooth. As a result, since the adjacent retainer segments are prevented from colliding with each other, a noise and abrasion due to the collision are prevented, and the retainer is prevented from being deformed and damaged.

Figure 29:
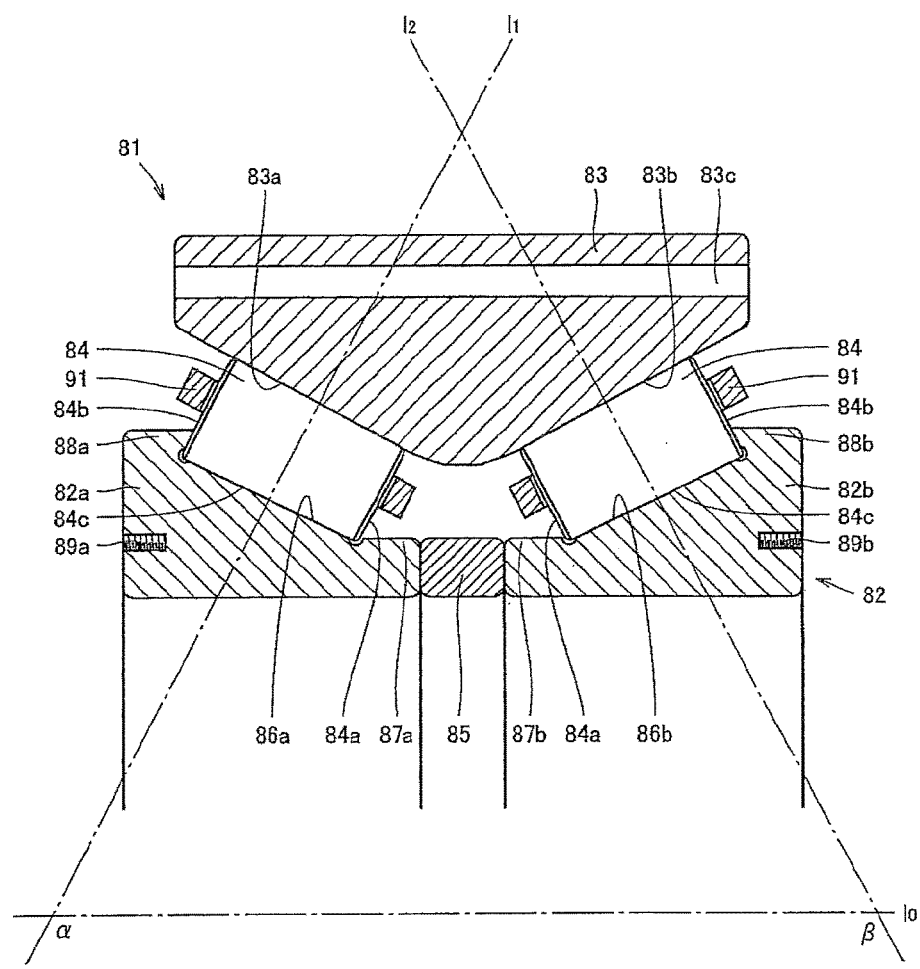
FIG. 29 is a view showing a tapered roller bearing supporting the main shaft of the wind-power generator.
Figure 30:
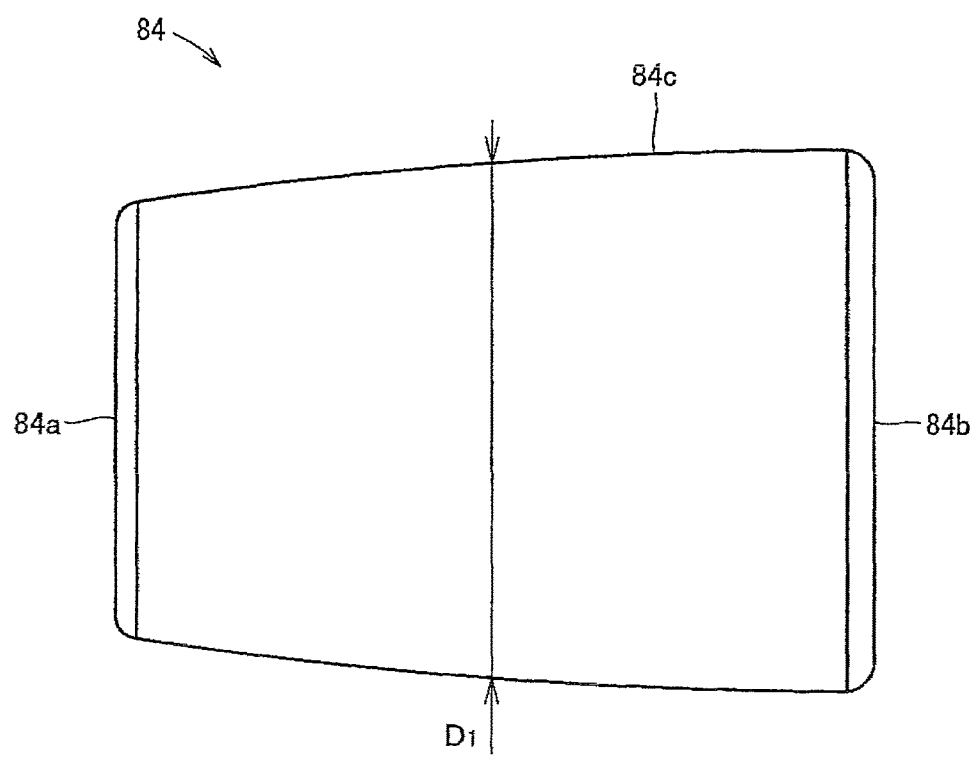
FIG. 30 is an enlarged view showing the tapered roller shown in FIG. 29.
Figure 31:
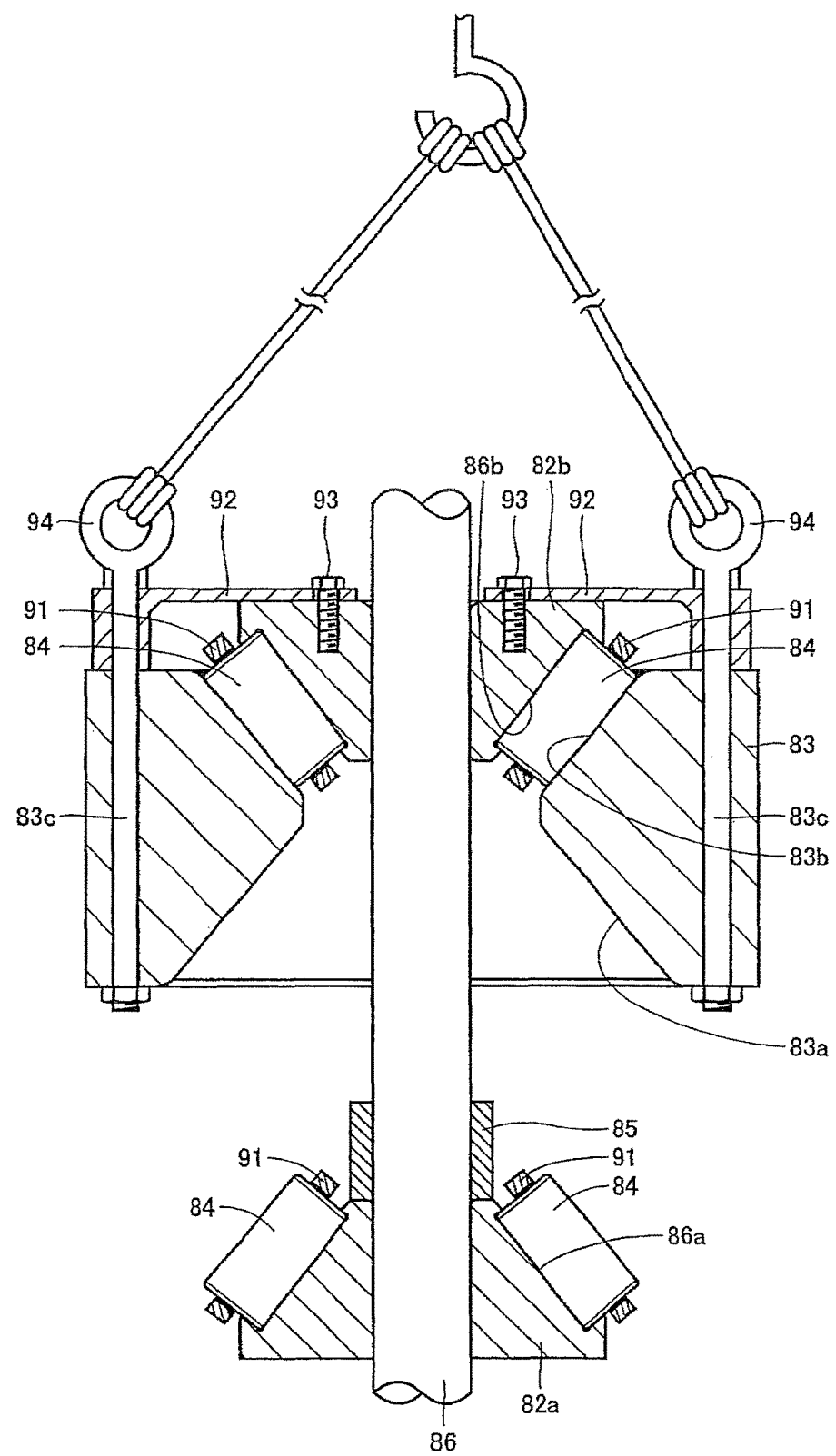
FIG. 31 is a view showing a state before one inner ring member of the tapered roller is assembled in a main shaft.
Figure 32:
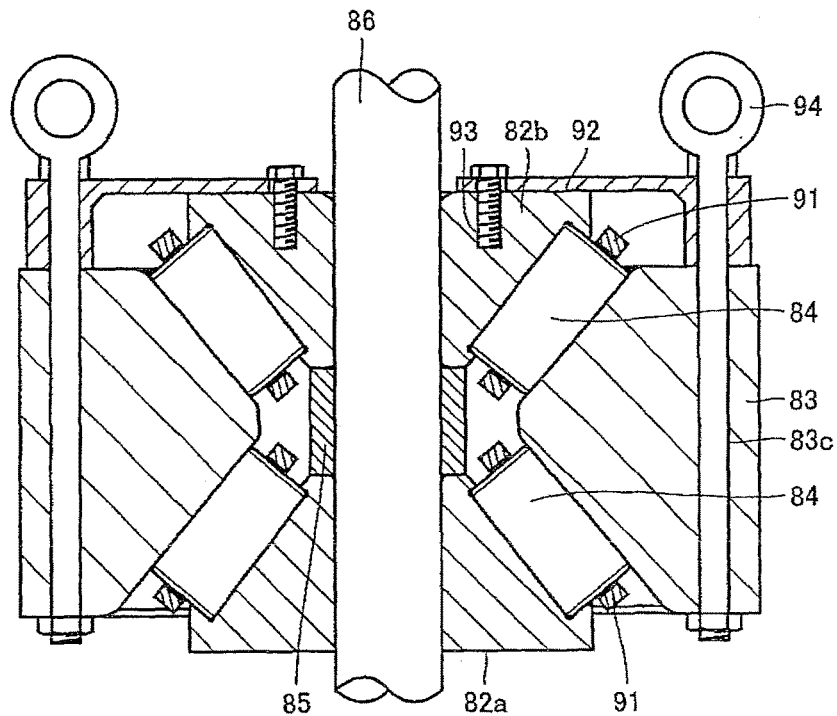
FIG. 32 is a view showing a state after a tapered roller bearing has been assembled in the main shaft.
Figure 33:
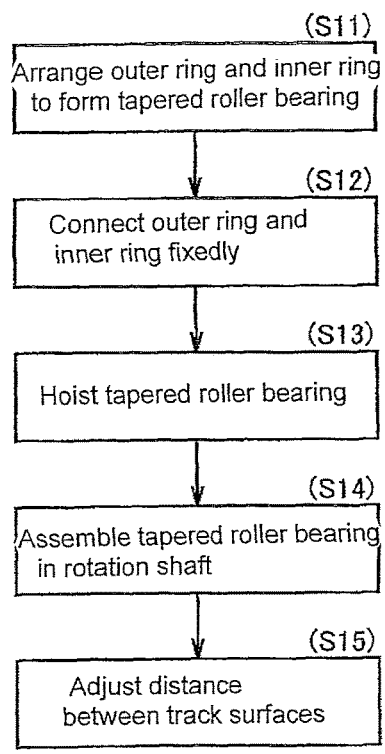
FIG. 33 is a flowchart showing a main method for assembling the one inner ring member of the tapered roller bearing in the main shaft.

FIGS. 29 and 30 are views showing a tapered roller bearing 81 applied to the above-described main shaft support bearing of the wind-power generator, and FIGS. 31 to 33 are views showing an assembling method for assembling the tapered roller bearing 81 in a main shaft 86.

Referring to FIG. 29, the tapered roller bearing 81 includes an inner ring 82 containing right and left inner ring members 82a and 82b, an outer ring 83, a plurality of tapered rollers 84, a retainer containing a plurality of retainer segments 91, and an inner ring intermediate element 85. In addition, since the retainer segment 91a is the same as the retainer segment shown in FIG. 2, its description will be omitted.

The inner ring member 82a has a track surface 86a on its outer diameter surface, a small flange 87a at one side end of the track surface 86a, a large flange 88a at the other side end thereof, and a plurality of bolt holes 89a extending in an axial direction at an end face on the side of the large flange 88a. The inner ring member 82b has the same constitution. Thus, the inner ring members 82a and 82b are arranged such that their small flanges 87a and 87b are opposed to each other so as to sandwich the inner ring intermediate element 85, whereby the inner ring 82 is formed. The outer ring 83 has double-row track surfaces 83a and 83b corresponding to the track surfaces 86a and 86b of the inner ring members 82a ad 82b, respectively, and a plurality of through holes 83c penetrating in the axial direction.

Referring to FIG. 30, the tapered roller 84 has a small end face 84a, a large end face 84b, and a rolling surface 84c, and arranged between the inner ring 82 and the outer ring 83 such that the small end faces 84a are opposed to the small flanges 87a and 87b of the inner ring members 82a and 82b.

In addition, a crowning is formed on the rolling surface 84c and its top is positioned in the center of the roller length. In addition, the "rolling surface" designates a length provided by removing chamfered parts on both ends, and it can be in contact with the track surfaces 86a, 86b, 83a, and 83b of the inner ring 82 and the outer ring 83 when assembled in the bearing.

The tapered roller bearing 81 having the above constitution is a back-to-back bearing in which the tapered rollers 84 are arranged in double rows in the axial direction and the small end faces 84a of the tapered rollers 84 in the right and left rows face each other. In addition, when it is assumed that a roller diameter of the tapered roller 84 at a certain position of the track surface 84c of the tapered roller 84 is D, and a distance between the track surfaces of the inner ring 82 and the outer ring 83 at the measurement position of the roller diameter of the tapered roller 84 is d, a relation D>d is satisfied in at least one position of the track surface 84c of each tapered roller 84. That is, the distance between the track surfaces is a negative clearance.

More specifically, when a load applied to the tapered roller bearing 81 is low (at the time of low load), the track surfaces 86a and 83a are in contact with the rolling surface only at the top of the crowning. Consequently, the negative clearance ($D_1 > d_1$) is provided only at the top of the crowning of each tapered roller 84. In addition, the distance $d_1$ designates a distance between the track surfaces at the position corresponding to the top of the crowning.

Meanwhile, when a load applied to the tapered roller bearing 81 is high (at the time of high load), the rolling surface 84c of the tapered roller 84 is elastically deformed and the contact area between the track surfaces 86a and 83a and the rolling surface 84c is increased. When the whole area of the rolling surface 84c is in contact with the track surfaces 86a and 83a, the negative clearance (D>d) is provided in the entire rolling surface 84c of the tapered roller 84.

When the distance between the track surfaces is the negative clearance as described above, the tapered roller 84 is prevented from slipping laterally, and its rotation movement and revolution movement become smooth. As a result, since the adjacent retainer segments are prevented from colliding with each other, a noise and abrasion due to the collision are prevented, and the retainer is prevented from being deformed and damaged.

In addition, since the distance between the track surfaces of the tapered roller bearing 81 is the negative clearance, a load is applied to all the tapered rollers 84 through the inner ring 82 and outer ring 83. As a result, even when the tapered roller bearing 81 is used under the circumstances containing a load region and a non-load region, it can support a high load and the rigidity of the tapered roller bearing 81 is improved. In addition, the "load region" designates a region in which a load is applied in the circumferential direction of the main shaft, and the "non-load region" designates a region in which a load is not applied. The load region and the non-load region are provided when a load biased in a predetermined direction is applied at the time of rotation of the main shaft of the wind-power generator, for example.

When the above tapered roller bearing 81 is used as the bearing to support the main shaft of the wind-power generator, the main shaft support structure of the wind-power generator can have a long life and can be highly reliable.

Although the top of the crowning is positioned in the center of the roller length of the tapered roller 84 in the above embodiment, it can be set at any position. In addition, although the crowning is formed on the rolling surface 84c in the above example, the present invention can be applied to a tapered roller bearing containing a tapered roller having no crowning.

In addition, although the double-row tapered roller bearing 81 is shown in the above embodiment, the present invention can be applied to a single-row bearing or a bearing having three or more rows of track surfaces. In addition, the back-to-back tapered roller bearing 81 is shown in the above, the present invention may be applied to a front-to-front bearing in which the large end faces 84b of the tapered rollers 84 are opposed to each other.

In the case of the back-to-back bearing, since a distance between points α and β at the intersection of a rotation center line $l_0$ of the bearing with contact lines $l_1$ and $l_2$ of the tapered rollers 84 in the right and left rows and the inner and outer rings 82 and 83 (referred to as the "distance between the action points" hereinafter) is increased, the rigidity is improved.

In addition, it is to be noted that the retainer used in the above tapered roller bearing includes various kinds of split type retainers cut at a circumferential certain position.

Next, a method for assembling the tapered roller bearing 81 in the main shaft 86 will be described with reference to FIGS. 31 to 33. In addition, FIGS. 31 and 32 are views showing before and after the tapered roller bearing 81 is assembled in the main shaft 86, and FIG. 33 is a flowchart showing main steps to assemble one inner ring member 82b of the tapered roller bearing 81, in the main shaft 86.

When the tapered roller bearing 81 is assembled in the main shaft 86 of the large wind-power generator, the main shaft 86 is fixed to the ground vertically. First, the inner ring member 82a is fit in the main shaft 86 with the side of the large flange 88a down. Then, the retainer segments 91 in which the tapered rollers 84 are housed in the pocket, and the intermediate element (not shown) are arranged so as to be continuously lined with each other on the track surface 86a of the inner ring member 82a. Here, since the tapered roller bearing 81 to support the main shaft 86 of the wind-power generator has a large tapered angle in general, the tapered roller 84 is caught by the large flange 88a and prevented from escaping without being tied on the track surface 86a. Then, the inner ring intermediate element 85 is fit in the main shaft 86.

Then, referring to FIG. 33, the inner ring member 82b and the outer ring 83 are assembled before assembled in the main shaft 86 (S11). More specifically, the inner ring member 82b is set with the side of the large flange 88b down. Then, the retainer segments 91 in which the tapered rollers 84 are housed in the pocket are arranged so as to be continuously lined with each other on the track surface 86b of the inner ring member 82b. Then, the outer ring 83 is assembled in such that the track surface 83b of the outer ring 83 is appropriately in contact with the track surface 84c of the tapered roller 84.

Then, the inner ring member 82b and the outer ring 83 are fixedly connected to each other (S12). More specifically, one end of an L-shaped fixing jig and a bolt hole 89b of the inner ring member 82b are fixed by a bolt 93, and the other end thereof and the through hole 83c of the outer ring 83 are fixed by a fixing bar 94. Thus, the tapered roller 84 is restrained between the track surfaces 86b and 83b and prevented from escaping.

Then, as shown in FIG. 31, the inner ring member 82b and the outer ring 83 connected fixedly are lifted (S13), and assembled in the main shaft 86 with the side of the track surface 83a of the outer ring 83 down (S14). Then, as shown in FIG. 32, the fixing jig 92 is removed after confirming that the track surface 83*a* of the outer ring 83 is appropriately in contact with the tapered roller 84 assembled in the inner ring member 82*a*.

Finally, the distance d between the track surfaces of the inner ring 82 and the outer ring 83 is adjusted (S15). More specifically, a width of the inner ring intermediate element 85 is previously adjusted, and the distance between the track surfaces is set to a predetermined value by applying a precompression between the inner ring members 82*a* and 82*b*.

According to the above assembling procedures, when the tapered roller bearing 81 is assembled in the main shaft 86, the tapered roller 84 and the retainer segment 91 are prevented from escaping. Thus, the tapered roller bearing 81 can be easily assembled in the main shaft 86.

In addition, even when the present invention is applied to other type bearings such as a self-aligning roller bearing, the effect of the present invention can be achieved. However, since the distance between the track surfaces can be easily adjusted in the tapered roller bearing as described above, the present invention is suitably applied to the tapered roller bearing.

In addition, the above assembling procedures are one example, so that another step may be added or the order of the steps may be exchanged. In addition, the fixing jig 92 may have any configuration as long as the inner ring member 82*b* and the outer ring 83 can be connected and fixed.

Although the bolt holes 89*a* and 89*b* are provided in the inner ring members 82*a* and 82*b*, respectively in view of general versatility, the bolt hole 89*b* may be only provided in the inner ring member 82*b* that is assembled with the side of the small flange 87*b* down in the interest of an assembling operation.

Here, the main shaft support structure of the wind-power generator according to the present invention includes the blade receiving wind power, the main shaft having one end fixed to the blade and rotating together with the blade, and the tapered roller bearing to support the main shaft rotatably. The tapered roller bearing has the inner ring, the outer ring, the plurality of tapered rollers having the rolling surfaces that are in contact with the inner ring and the outer ring, and the plurality of retainer segments having the plurality of column parts extending along the shaft so as to form the pockets to hold the tapered rollers and the connection parts extending in the circumferential direction so as to connect the plurality of column parts, and arranged so as to be continuously lined with each other in the circumferential direction between the inner ring and the outer ring. When it is assumed that the roller diameter of the tapered roller at a certain position of the rolling surface is D, and the distance between the track surfaces of the inner ring and the outer ring at the measurement position of the roller diameter of the tapered roller is d, the relation D>d may be satisfied in at least one position of the rolling surface of each tapered roller.

When the above tapered roller bearing is employed, the main shaft support structure of the wind-power generator can be highly reliable and have a long life.

In addition, the main shaft support structure of the wind-power generator according to the present invention may employ a main shaft support structure of the wind-power generator having the following constitution. More specifically, the main shaft support structure of the wind-power generator includes the blade receiving wind power, the main shaft having one end fixed to the blade and rotating together with the blade, and a tapered roller bearing to support the main shaft rotatably. The tapered roller bearing has an inner ring and an outer ring having track surfaces, and a plurality of tapered rollers having the rolling surfaces to be in contact with the track surfaces. Thus, the tapered roller bearing is a retainerless roller bearing in which the adjacent rollers are arranged so as to be in contact with each other.

When the retainerless roller bearing having the above constitution is employed as the bearing to support the main shaft of the wind-power generator, the number of the tapered rollers that can be housed can be increased as compared with the tapered roller bearing of the same size having the retainer. As a result, load capacity of the bearing is increased as a whole.

Figure 34:
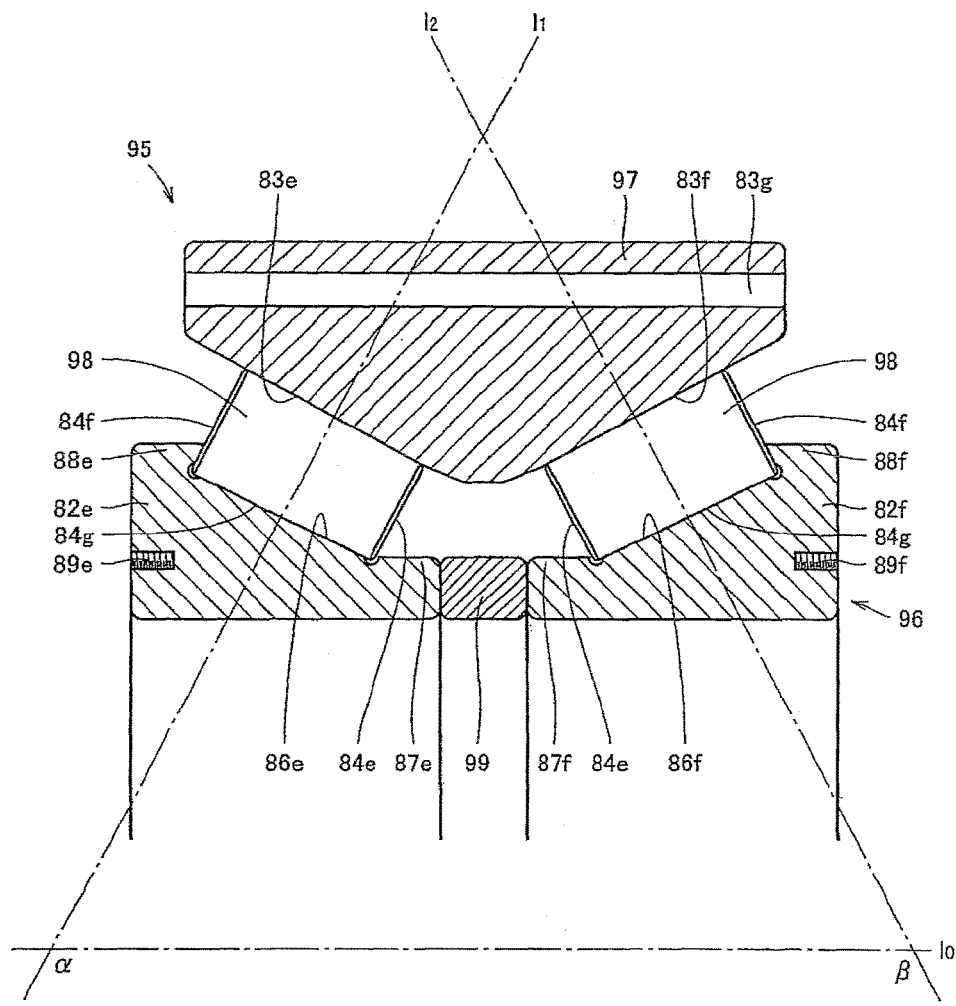
FIG. 34 is a view showing a tapered roller bearing supporting the main shaft of the wind-power generator.
Figure 35:
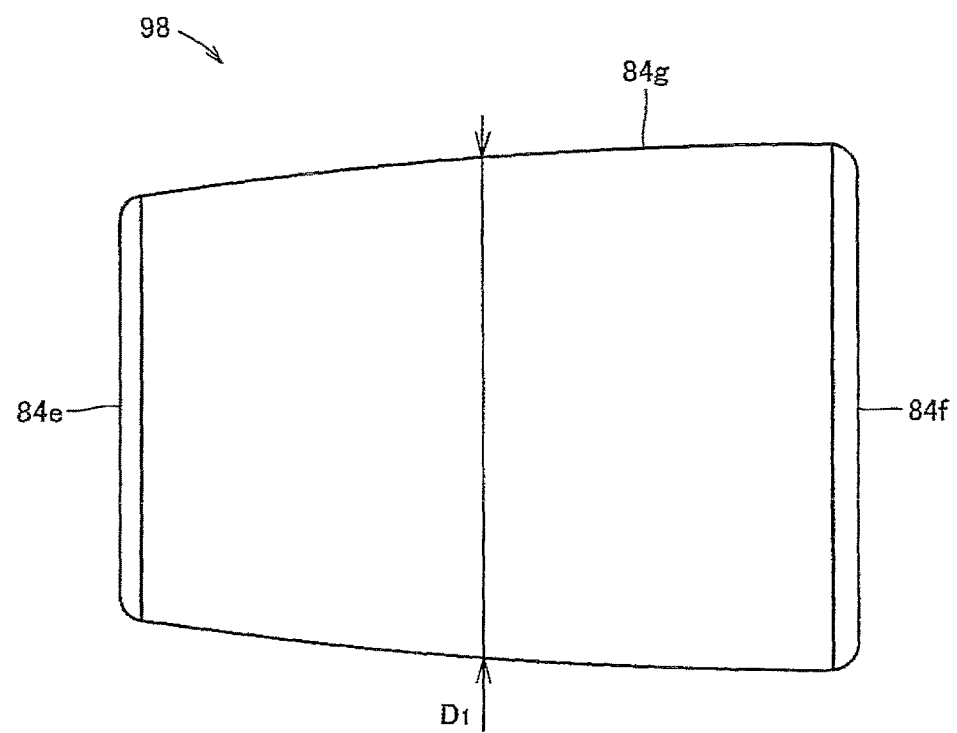
FIG. 35 is an enlarged view showing the tapered roller shown in FIG. 34.
Figure 36:
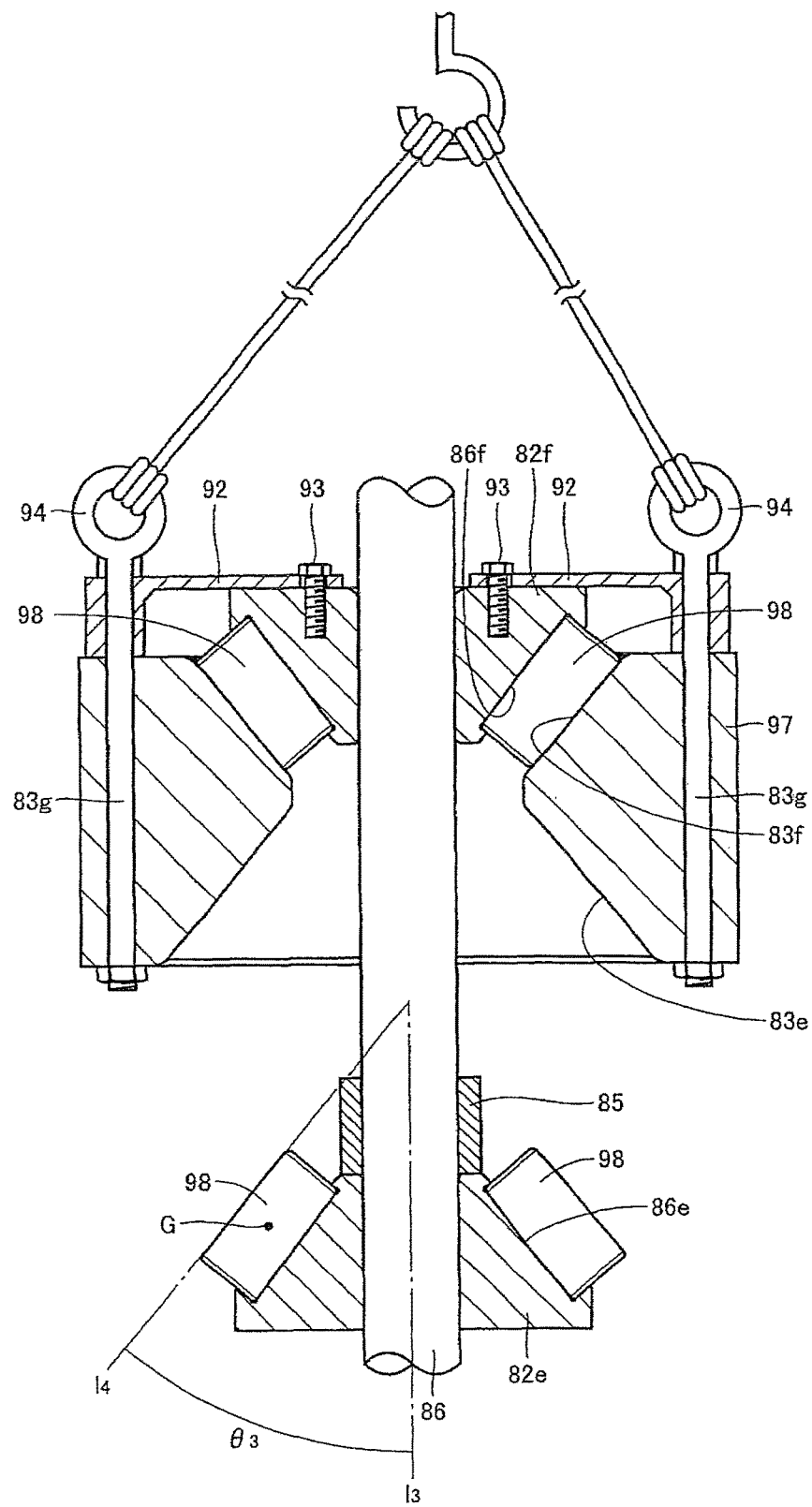
FIG. 36 is a view showing a state before the one inner ring member of the tapered roller bearing is assembled in the main shaft.
Figure 37:
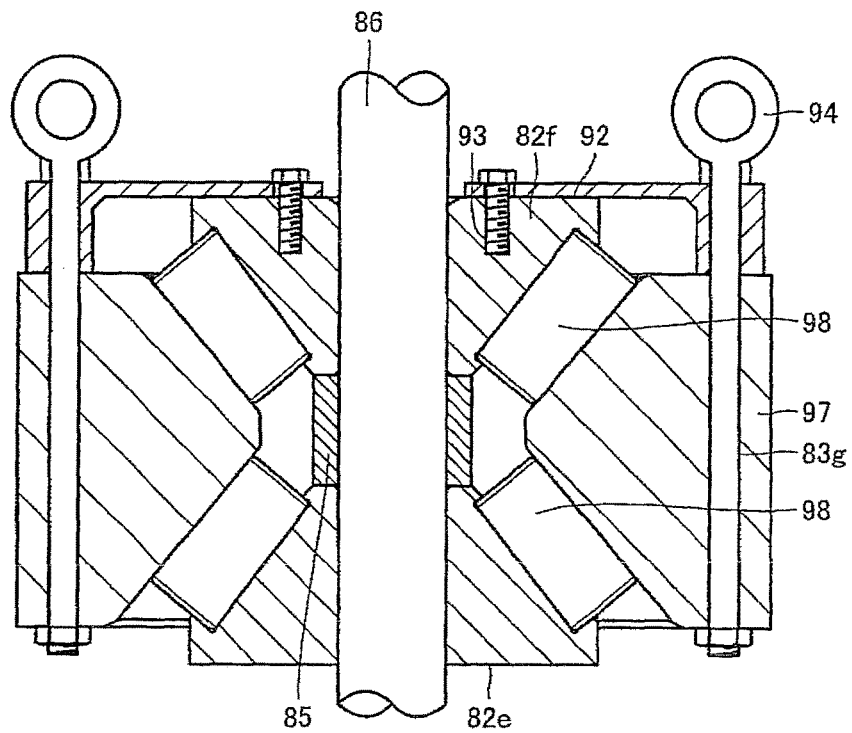
FIG. 37 is a view showing a state after the tapered roller bearing has been assembled in the main shaft.
Figure 38:
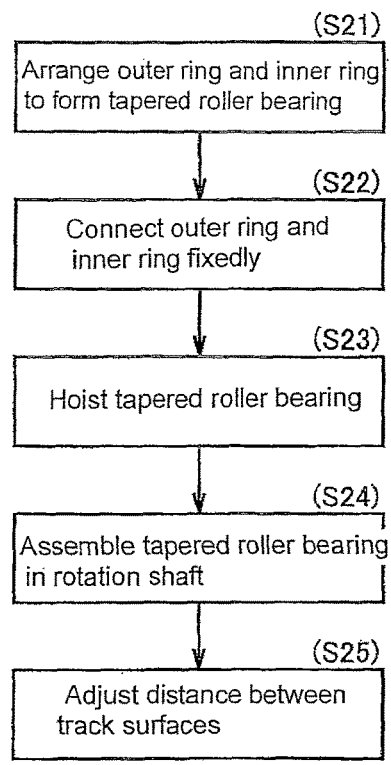
FIG. 38 is a flowchart showing a main method for assembling the one inner ring member of the tapered roller bearing in the main shaft.
Figure 39:
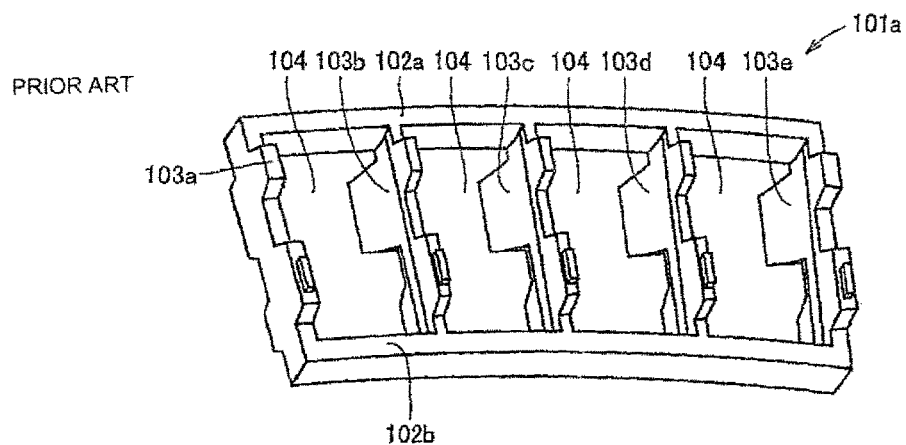
FIG. 39 is a perspective view showing a conventional retainer segment.
Figure 40:
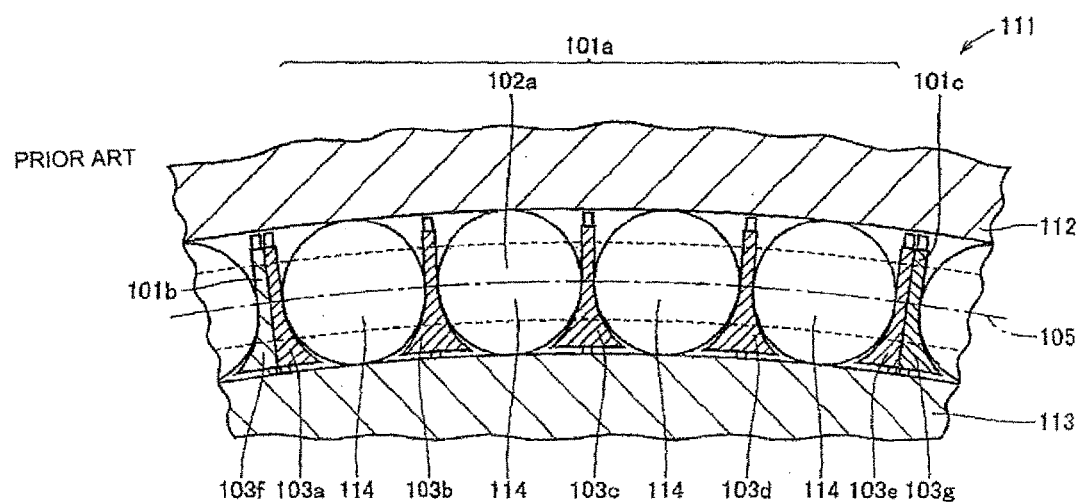
FIG. 40 is a sectional view showing a part of a tapered roller bearing including the retainer segment shown in FIG. 39 cut by a plane crossing a rolling axis of the bearing at right angles.
Figure 41:
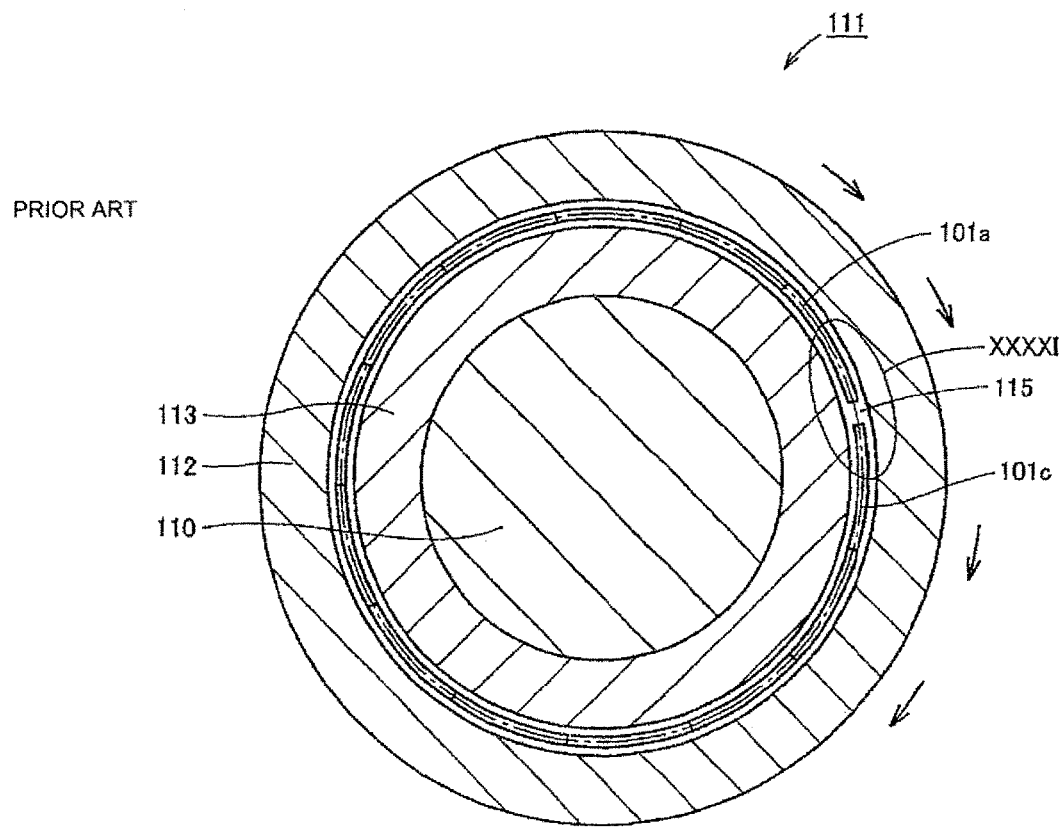
FIG. 41 is a schematic sectional view showing the tapered roller bearing including the retainer segment shown in FIG. 40 cut by a plane crossing the rolling axis of the bearing at right angles.
Figure 42:
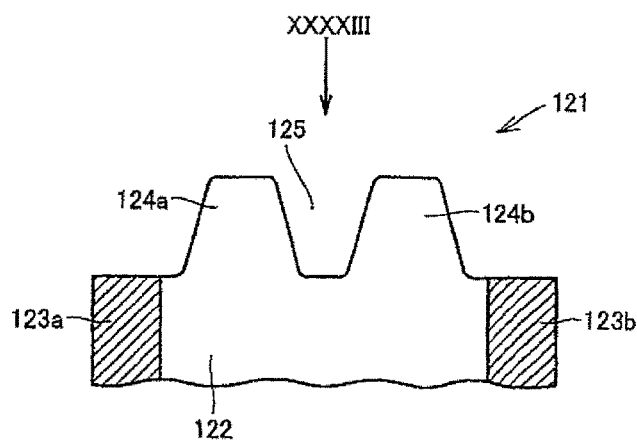
FIG. 42 is a view showing one part of a retainer segment provided with a split type guide click.
Figure 43:
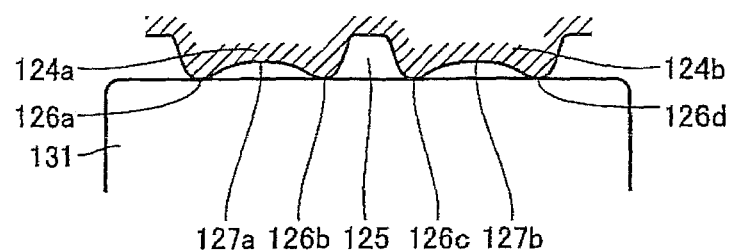
FIG. 43 is a view showing the retainer segment shown in FIG. 42 taken from a radial direction.
Figure 44:
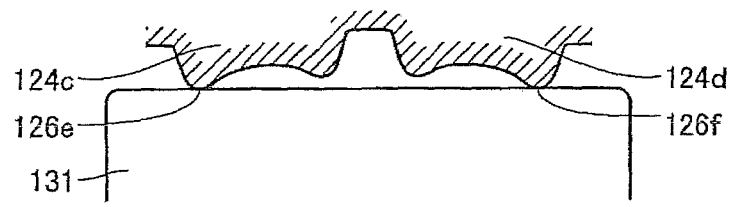
FIG. 44 is a view showing the retainer segment taken from the radial direction when one edge part of the guide click is in contact with a roller.

FIGS. 34 and 35 show a tapered roller bearing 95 to support the main shaft 86 of the wind-power generator, and FIGS. 36 to 38 show a method for assembling the tapered roller bearing 95 in the main shaft 86.

Referring to FIG. 34, the tapered roller bearing 95 includes an inner ring 96 having right and left inner ring members 82*e* and 82*f*, an outer ring 97, a plurality of tapered rollers 98, and an inner ring intermediate element 85.

The inner ring member 82*e* has a track surface 86*e* on an outer diameter surface, a small flange 87*e* at one side end of the track surface 86*e*, a large flange 88*e* at the other side end thereof, and a plurality of bolt holes 89*e* provided at the end face on the side of the large flange 88*e* and extending in the axial direction. The inner ring member 82*f* has the same constitution. Thus, the inner ring 96 is constituted by arranging the inner ring members 82*e* and 82*f* such that the small flanges 87*e* and 87*f* are opposed to sandwich the inner ring intermediate element 85. The outer ring 97 has double-row track surfaces 83*e* and 83*f* corresponding to the track surfaces 86*e* and 86*f* of the inner ring members 82*e* and 82*f*, respectively, and a plurality of through holes 83*g* penetrating in the axial direction.

Referring to FIG. 35, the tapered roller 98 has a small end face 84*e*, a large end face 84*f*, and a rolling surface 84*g*, and arranged between the inner ring 96 and the outer ring 97 such that the small end faces 84*e* are opposed to the small flanges 87*e* and 87*f* of the inner ring members 82*e* and 82*f*. In addition, a crowning is formed on the rolling surface 84*g*, and its top is positioned in the center of the roller length.

The above tapered roller bearing 95 is a back-to-back bearing in which the tapered rollers 98 are arranged in the axial direction in double rows and the small end faces 84*e* of the tapered rollers 98 in the right and left rows are opposed to each other. In addition, the bearing 95 is the retainerless roller bearing in which the adjacent tapered rollers 98 are arranged so as to be in contact with each other on each track surface.

In addition, when a roller diameter of the tapered roller 98 at a certain position of the track surface 84*g* thereof is D, and a distance between the track surfaces of the inner ring 96 and the outer ring 97 at the measurement position of the roller diameter of the tapered roller 98 is d, a relation D>d is satisfied in at least one position of the track surface 84*g* of each tapered roller 98. That is, the distance between the track surfaces is a negative clearance.

More specifically, when a load applied to the tapered roller bearing 95 is low (at the time of low load), the track surfaces 86*e* and 83*e* are in contact with the rolling surface 84*g* only at the top of the crowning. Consequently, the negative clearance ($D_1 > d_1$) is provided only at the top of the crowning of each tapered roller 98. In addition, the distance $d_1$ designates a distance between the track surfaces at the position corresponding to the top of the crowning.

Meanwhile, when a load applied to the tapered roller bearing 95 is high (at the time of high load), the rolling surface 84g of the tapered roller 98 is elastically deformed and the contact area between the track surfaces 86e and 83e and the rolling surface 84g is increased. When the whole area of the rolling surface 84g is in contact with the track surfaces 86e and 83e, the negative clearance (D>d) is provided over the entire rolling surface 84g of the tapered roller 98.

As described above, when the retainerless roller bearing 95 is employed, the number of the tapered rollers 98 that can be housed can be increased as compared with the tapered roller bearing of the same size having the retainer. As a result, the load capacity of the bearing is increased as a whole. In addition, since the distance between the track surfaces is the negative clearance, the load is applied to all of the tapered rollers 98 through the inner and outer rings 96 and 97. As a result, even when the tapered roller bearing 95 is used under the circumstances containing the load region and the non-load region, it can support a high load and its rigidity is improved.

In addition, since the rotation directions of the adjacent tapered rollers 98 at the contact position are opposite to each other, the problems is that the rotation defect is generated due to the interference of the adjacent tapered rollers 98 in the retainerless tapered roller bearing 95. However, since the distance between the track surfaces is the negative clearance, the tapered roller 98 can be prevented from slipping laterally, so that the rotation defect due to the interference between the adjacent tapered rollers 98 can be prevented. As a result, the rotation movement and revolution movement of the tapered roller 98 become smooth.

When the above tapered roller bearing 95 is used as the bearing to support the main shaft of the wind-power generator, the main shaft support structure of the wind-power generator can have a long life and can be highly reliable.

Although the top of the crowning is positioned in the center of the roller length of the tapered roller 98 in the above embodiment, it can be set at any position. In addition, the crowning is formed on the rolling surface 84g in the above example, the present invention can be applied to a tapered roller bearing containing a tapered roller having no crowning.

In addition, although the double-row tapered roller bearing 95 is shown in the above embodiment, the present invention can be applied to a single-row bearing or a bearing having three or more rows of track surfaces. In addition, the back-to-back tapered roller bearing 95 is shown in the above, the present invention may be applied to a front-to-front bearing in which the large end faces 84f of the tapered rollers 98 are opposed to each other.

In the case of the back-to-back bearing, since a distance between points α and β at intersection of a rotation center line $l_0$ of the bearing with contact lines $l_1$ and $l_2$ of the tapered rollers 98 in the right and left rows and the inner and outer rings 96 and 97, that is, the distance between the action points is increased, the rigidity is improved.

Next, a method for assembling the tapered roller bearing 95 in the main shaft 86 will be described with reference to FIGS. 36 to 38. In addition, FIGS. 36 and 37 are views showing before and after the tapered roller bearing 95 is assembled in the main shaft 86, and FIG. 38 is a flowchart showing main steps to assemble one inner ring member 82f of the tapered roller bearing 95, in the main shaft 86.

When the tapered roller bearing 95 is assembled in the main shaft 86 of the large wind-power generator, the main shaft 86 is fixed to the ground vertically. First, the inner ring member 82e is fit in the main shaft 86 with the side of the large flange 88e down. Then, the tapered roller 98 is assembled in the track surface 86e of the inner ring member 82e. Here, since a center of gravity G of the tapered roller 98 is positioned radial inner side of the outer diameter surface of the large flange 88e, the tapered roller 98 is caught by the large flange 88e and prevented from escaping without being tied on the track surface 86e. Then, the inner ring intermediate element 85 is fit in the main shaft 86.

According to the tapered roller bearing 95 to support the main shaft 86 of the wind-power generator, a thrust load generated when the blade receives wind, and a radial load and a moment load generated due to the own weight of the blade are applied. Thus, in order to support the loads appropriately, an angle $\theta_3$ formed between a rotation center ring $l_3$ of the tapered roller bearing 95, and a phantom line $l_4$ of the outer diameter surface of the tapered roller 98 to be in contact with the track surface 83e of the outer ring 97, that is, the track surface 83e of the outer ring 97 (referred to as the "contact angle" hereinafter) is set such that $\theta_3 \geq 40°$. In addition, a contact angle of the conventional general tapered roller bearing is about 10° to 35°.

Then, referring to FIG. 38, the inner ring member 82f and the outer ring 97 are assembled before assembled in the main shaft 86 (S21). More specifically, the inner ring member 82f is set with the side of the large flange 88e down. Then, the tapered roller 98 is assembled in the track surface 86f of the inner ring member 82f. Then, the outer ring 97 is assembled in such that the track surface 83f of the outer ring 97 is appropriately in contact with the rolling surface 84g of the tapered roller 98.

Then, the inner ring member 82f and the outer ring 97 are fixedly connected to each other (S22). More specifically, one end of an L-shaped fixing jig 92 and a bolt hole 89f of the inner ring member 82f are fixed by the bolt 93, and the other end thereof and the through hole 83g of the outer ring 97 are fixed by the fixing bar 94. Thus, the tapered roller 98 is restrained between the track surfaces 86f and 83f and prevented from escaping.

Then, as shown in FIG. 36, the inner ring member 82f and the outer ring 97 connected fixedly are lifted (S23), and assembled in the main shaft 86 with the side of the track surface 83e of the outer ring 97 down (S24). Then, as shown in FIG. 37, the fixing jig 92 is removed after confirming that the track surface 83e of the outer ring 97 is appropriately in contact with the tapered roller 98 assembled in the inner ring member 82e.

Finally, the distance d between the track surfaces of the inner ring 96 and the outer ring 97 is adjusted (S25). More specifically, a width of the inner ring intermediate element 85 is previously adjusted, and the distance between the track surfaces is set to a predetermined value by applying a precompression between the inner ring members 82e and 82f. More specifically, the negative clearance ($D_1 > d_1$) is provided at the top of the crowning of each tapered roller 98.

In addition, the above assembling procedures are one example, so that another step may be added or the order of the steps may be exchanged. In addition, the fixing jig 92 may have any configuration as long as the inner ring member 82f and the outer ring 97 can be connected and fixed.

According to the above assembling procedures, when the retainerless tapered roller bearing 95 is assembled in the main shaft 86, the tapered roller 98 is prevented from escaping. Thus, the tapered roller bearing 95 can be easily assembled in the main shaft 86.

In addition, even when the present invention is applied to other type bearings such as a self-aligning roller bearing, the effect of the present invention can be achieved. However, since the distance between the track surfaces is easily adjusted in the tapered roller bearing as described above, the present invention is suitably applied to the tapered roller bearing.

Here, the center of gravity of the tapered roller 98 is moved toward the radial inner side of the tapered roller bearing 95 as the contact angle $\theta_3$ is increased. Therefore, the above assembling method is suitable for the bearing having the large contact angle $\theta_3$ such as the tapered roller bearing 95 to support the main shaft 86 of the wind-power generator. In addition, as another method for moving the center of gravity of the tapered roller toward the radial inner side, the roller angle may be extremely decreased, or the outer diameter of the large flange may be extremely increased. However, in those cases, since the load capacity is lowered and the rotation of the tapered roller becomes unstable, the methods are not suitable for the bearing to support the main shaft 86 of the wind-power generator.

Furthermore, although the bolt holes 89e and 89f are provided in the inner ring members 82e and 82f, respectively in view of general versatility, the bolt hole 89f may be provided only in the inner ring member 82f that is assembled with the side of the small flange 87f down in the interest of an assembling operation.

In addition, although the tapered roller is used as the roller provided in the retainer segment in the above embodiment, a cylindrical roller, a needle roller, a bar type roller may be used instead.

Although the embodiments of the present invention have been described with reference to the drawings in the above, the present invention is not limited to the above-illustrated embodiments. Various kinds of modifications and variations may be added to the illustrated embodiments within the same or equal scope of the present invention.

INDUSTRIAL APPLICABILITY

The roller bearing according to the present invention is effectively used in the main shaft support structure of the wind-power generator requiring to prevent its function from being lowered.

In addition, the retainer segment of the roller bearing for supporting the main shaft of the wind-power generator according to the present invention is effectively used to prevent the function of the bearing from being lowered.

Furthermore, the main shaft support structure of the wind-power generator according to the present invention can be effectively used when the function is required to be prevented from being lowered.

The invention claimed is:

1. A retainer segment provided in a roller bearing, for supporting a main shaft of a wind-power generator, having a pocket to house a roller, and arranged so as to be continuously lined with each other in a circumferential direction, wherein
said retainer segment is formed of a resin containing a filler material, wherein the thermal linear expansion coefficient of said retainer segment is $1.3 \times 10^{-5}/C.°$ to $1.7 \times 10^{-5}/C.°$, the filler material lowering the thermal linear expansion coefficient for the retainer segment as compared to a retainer segment that is made only of said resin,
wherein lowering of the thermal linear expansion coefficient of the retainer segment such that the thermal linear expansion coefficient of the retainer segment approximates a thermal linear expansion coefficient of a steel bearing component of the roller bearing and a circumferential spacing between adjacent retainer segments is within a range so that a function of the roller bearing can be prevented from being lowered as a result of pushing between adjacent retainer segments, and
further wherein the retainer segment is sized for a roller bearing that supports the main shaft of a wind power generator, the roller bearing having a pocket to house a roller, in the roller bearing, a plurality of retainer segments are continuously lined with each other in a circumferential direction of the roller bearing.

2. The retainer segment of the roller bearing for supporting the main shaft of the wind-power generator according to claim 1, wherein
said filler material contains carbon fiber and/or glass fiber.

3. The retainer segment of the roller bearing for supporting the main shaft of the wind-power generator according to claim 1, wherein
said resin comprises polyether ether ketone.

4. The retainer segment of the roller bearing for supporting the main shaft of the wind-power generator according to claim 1, wherein
a filling rate of said filler material in said resin is 20% by weight to 40% by weight.

5. A plurality of retainer segments provided in a roller bearing, for supporting a main shaft of a wind-power generator, having a pocket to house a roller, the plurality of retainer segments arranged so as to be continuously lined with each other in a circumferential direction, each retainer segment of the plurality of retainer segments comprising the retainer segment according to claim 1.

6. The retainer segment of the roller bearing for supporting the main shaft of the wind-power generator according to claim 1, having a plurality of column parts extending along a rotation axis of the bearing so as to form pockets to house rollers, and a connection parts extending in the circumferential direction so as to connect the plurality of column parts, wherein
said retainer segment guides said rollers, and
one guide click having a contact part with said roller and a recess part formed on the circumferential inner side of said contact part are provided at a side wall surface of said column part.

7. The retainer segment of the roller bearing for supporting the main shaft of the wind-power generator according to claim 6, wherein
said recess part is formed by shrinkage generated when said retainer segment is molded.

* * * * *